(12) United States Patent
Matsumoto et al.

(10) Patent No.: US 12,508,847 B2
(45) Date of Patent: Dec. 30, 2025

(54) TIRE

(71) Applicant: BRIDGESTONE CORPORATION, Tokyo (JP)

(72) Inventors: Hiroyuki Matsumoto, Tokyo (JP); Yoshio Kaji, Tokyo (JP); Hiroshi Nomura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/693,154

(22) PCT Filed: May 19, 2022

(86) PCT No.: PCT/JP2022/020858
§ 371 (c)(1),
(2) Date: Mar. 19, 2024

(87) PCT Pub. No.: WO2023/074032
PCT Pub. Date: May 4, 2023

(65) Prior Publication Data
US 2024/0383284 A1 Nov. 21, 2024

(30) Foreign Application Priority Data

Oct. 28, 2021 (JP) ................................ 2021-176993

(51) Int. Cl.
*B60C 11/12* (2006.01)
*B60C 11/03* (2006.01)

(52) U.S. Cl.
CPC ...... *B60C 11/1236* (2013.01); *B60C 11/1259* (2013.01); *B60C 11/0306* (2013.01); *B60C 2011/1254* (2013.01); *B60C 2011/129* (2013.01)

(58) Field of Classification Search
CPC ..... B60C 2011/1254; B60C 2011/1209; B60C 2011/129; B60C 11/1236; B60C 11/12
See application file for complete search history.

(56) References Cited

U.S. PATENT DOCUMENTS

| 3,605,847 A | 9/1971 | Gough |
| 2010/0154952 A1* | 6/2010 | Kageyama .......... B60C 11/0304 |
| | | 152/209.18 |

(Continued)

FOREIGN PATENT DOCUMENTS

DE 102012104468 A1 11/2013
EP 2569171 B1 * 1/2015 ........... B60C 11/032

(Continued)

OTHER PUBLICATIONS

Dec. 18, 2024, search result of the Extended European Search Report issued by the European Patent Office in the corresponding European Patent Application No. 22886369.2.

(Continued)

*Primary Examiner* — Katelyn W Smith
*Assistant Examiner* — Thomas Frank Schneider
(74) *Attorney, Agent, or Firm* — KENJA IP LAW PC

(57) ABSTRACT

The tire of this disclosure is a tire having a land portion on a tread surface, wherein the land portion comprises a sipe unit consisting of a pair of sipes, each of the pair of sipes extends such that both ends in the extending direction of sipes terminate within the land portion, and the pair of sipes are opposed to each other in the tire circumferential direction only in part in the tire width direction.

21 Claims, 15 Drawing Sheets

(56) References Cited

U.S. PATENT DOCUMENTS

| | | | | |
|---|---|---|---|---|
| 2012/0298270 | A1* | 11/2012 | Berger | B60C 11/1281 152/209.18 |
| 2014/0318677 | A1 | 10/2014 | Kaneko et al. | |
| 2018/0126793 | A1 | 5/2018 | Ito | |

FOREIGN PATENT DOCUMENTS

| | | | | |
|---|---|---|---|---|
| EP | 2862729 | A1 * | 4/2015 | B60C 11/1236 |
| GB | 1463545 | A | 2/1977 | |
| JP | S5211084 | B1 | 3/1977 | |
| JP | H06191234 | A | 7/1994 | |
| JP | 2000289413 | A * | 10/2000 | |
| JP | 2002347413 | A | 12/2002 | |
| JP | 2003136916 | A * | 5/2003 | |
| JP | 2005186827 | A | 7/2005 | |
| JP | 2010163089 | A | 7/2010 | |
| JP | 2017165140 | A | 9/2017 | |
| JP | 2018075879 | A | 5/2018 | |
| JP | 2019026015 | A | 2/2019 | |
| JP | 2019098981 | A | 6/2019 | |
| JP | 2021165110 | A | 10/2021 | |
| WO | 2011141281 | A1 | 11/2011 | |
| WO | 2013047691 | A1 | 4/2013 | |
| WO | 2020226006 | A1 | 11/2020 | |

OTHER PUBLICATIONS

Apr. 30, 2024, International Preliminary Report on Patentability issued in the International Patent Application No. PCT/JP2022/020858.

Jul. 12, 2022, International Search Report issued in the International Patent Application No. PCT/JP2022/020858.

* cited by examiner

FIG. 14

| | Comparative Example 1 | Comparative Example 2 | Comparative Example 3 | Example 1 | Example 2 |
|---|---|---|---|---|---|
| Sipe shapes | (Unit:mm) with dimensions 6, 15.59, 30 (BL), 27 (BW), (6)(6)(6)(6)(6) | | | | |
| Average sipe spacing | 6mm | 5mm | 4.29mm | 6mm | 5mm |
| Sipe density | 0.167/mm | 0.2/mm | 0.23/mm | 0.167/mm | 0.2/mm |
| Number of sipes | Four | Five | Six | Equivalent to four | Equivalent to five |

TIRE

TECHNICAL FIELD

This disclosure relates to a tire.

BACKGROUND

Conventionally, narrow grooves called sipes have been provided in the land portion of the tread of tires, particularly studless tires, in order to improve on-ice gripping performance of the tire. These sipes allow water that gushes out when the icy road surface melts on the contact patch of the tire to be discharged to the outside of the contact patch, thereby improving the on-ice gripping performance of the tire.

For example, Patent Document 1 proposes a technique that improves the on-ice gripping performance by densely arranging sipes while preventing a reduction in rigidity of the land portion.

CITATION LIST

Patent Literature

PTL 1: JP 2005-186827 A1

SUMMARY

Technical Problem

However, the compatibility between the rigidity of the land portion and the water drainage by the sipes in the prior art is not sufficient, and further improvement on the on-ice gripping performance of the tire is still required.

It is an object of the present disclosure, made in view of the above circumstances, to provide a tire with improved on-ice gripping performance.

Solution to Problem

The tire according to the present disclosure is a tire having a land portion on a tread surface, wherein the land portion comprises a sipe unit consisting of a pair of sipes, each of the pair of sipes extends such that both ends in the extending direction of sipes terminate within the land portion, and the pair of sipes are opposed to each other in the tire circumferential direction only in part in the tire width direction.

Advantageous Effect

According to the present disclosure, it is possible to provide a tire with improved on-ice gripping performance.

BRIEF DESCRIPTION OF THE DRAWINGS

In the accompanying drawings:

FIG. 14 a table providing Examples and Comparative Examples; and

DETAILED DESCRIPTION

Figure 1:
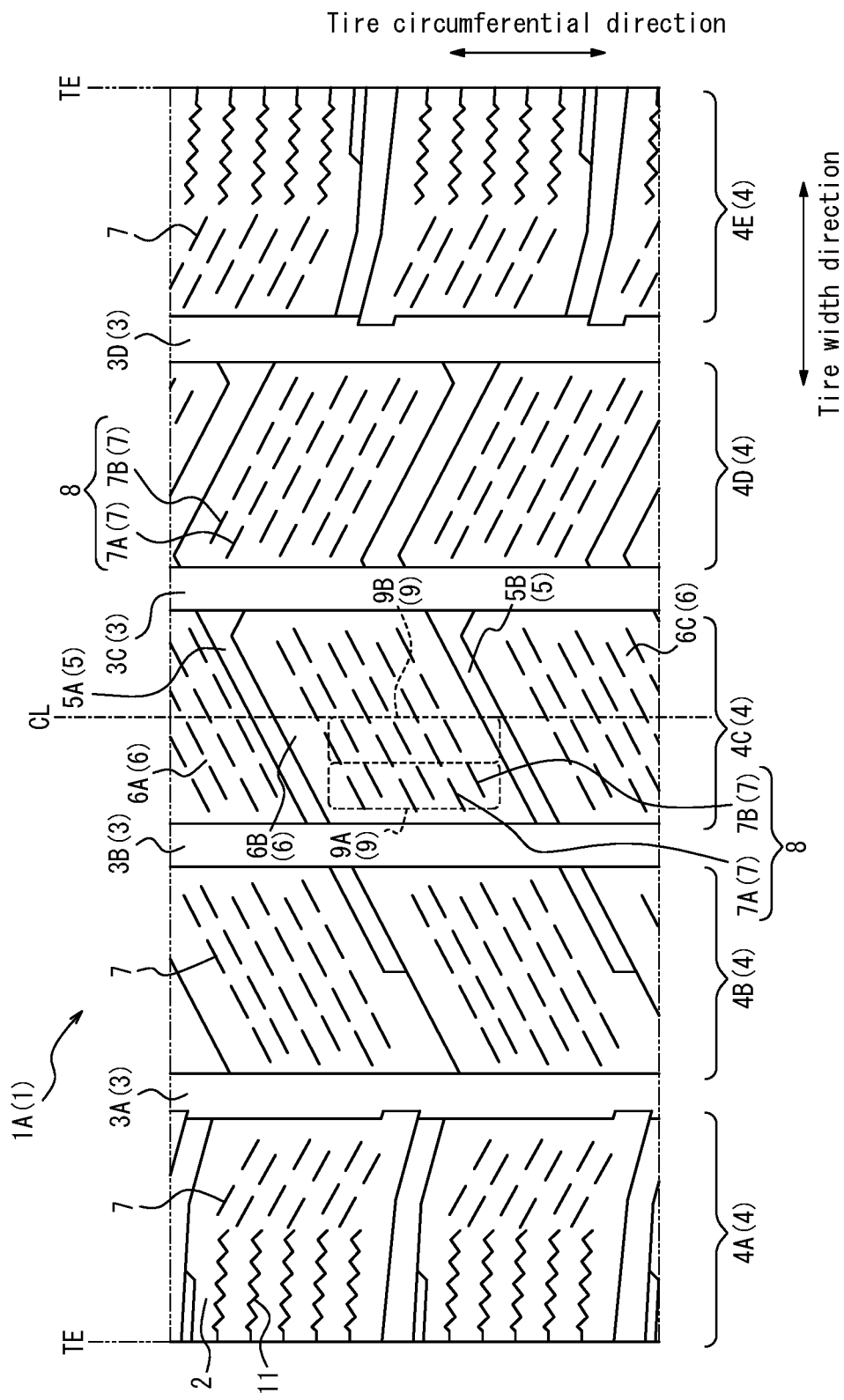
FIG. 1 is a schematic developed view of the tread pattern of the tire according to the first embodiment of this disclosure.

Hereinafter, embodiments of a tire according to the present disclosure will be described with reference to the drawings. Common members and parts in each figure are designated by the same reference numerals. However, it should be noted that the drawings are schematically drawn, and the ratio of each dimension may differ from the actual one.

As used herein, the "tire width direction" refers to the direction parallel to the tire rotation axis, and the "tire radial direction" refers to the direction perpendicular to the tire rotation axis. The "tire circumferential direction" refers to the direction in which the tire rotates around the tire rotation axis.

As used herein, the side closer to the tire rotation axis along the tire radial direction is referred to as the "inner side in the tire radial direction" and the side farther from the tire rotation axis along the tire radial direction is referred to as the "outer side in the tire radial direction". At the same time, the side closer to the tire equatorial plane CL along the tire width direction is referred to as the "inner side in the tire width direction" and the side farther from the tire equatorial plane CL along the tire width direction is referred to as the "outer side in the tire width direction".

As used herein, unless otherwise noted, the positional relationship of each element of the tire, etc., shall be measured in a reference condition. In this document, the "reference condition" refers to the condition in which the tire is mounted on a rim of a wheel, which is an applicable rim, filled with prescribed internal pressure, and unloaded.

As used herein, the "applicable rim" refers to the standard rim in the applicable size (Measuring Rim in ETRTO's STANDARDS MANUAL and Design Rim in TRA's YEAR BOOK) as described or as may be described in the future in the industrial standard, which is valid for the region in which the tire is produced and used, such as JATMA YEAR BOOK of JATMA (Japan Automobile Tyre Manufacturers Association) in Japan, STANDARDS MANUAL of ETRTO (The European Tyre and Rim Technical Organization) in Europe, and YEAR BOOK of TRA (The Tire and Rim Association, Inc.) in the United States. For sizes not listed in these industrial standards, the "applicable rim" refers to a rim with a width corresponding to the bead width of the tire. The "applicable rim" includes current sizes as well as future sizes to be listed in the aforementioned industrial standards. An example of the "size as described in the future" could be the sizes listed as "FUTURE DEVELOPMENTS" in the ETRTO 2013 edition.

As used herein, the "prescribed internal pressure" refers to the air pressure (maximum air pressure) corresponding to the maximum load capacity of a single wheel in the applicable size and ply rating, as described in the aforementioned JATMA YEAR BOOK and other industrial standards. In the case that the size is not listed in the aforementioned industrial standards, the "prescribed internal pressure" refers to the air pressure (maximum air pressure) corresponding to the maximum load capacity specified for each vehicle in which the tire is mounted. In addition, as used herein, the "prescribed load" refers to the load corresponding to the maximum load capacity of a single tire in the applicable size and ply rating described in the aforementioned industrial standards, or, for sizes not listed in the aforementioned industrial standards, the "prescribed load" refers to the load corresponding to the maximum load capacity specified for each vehicle in which the tire is mounted.

As used herein, the "tread surface" means the outer surface around the entire circumference of the tire that is in contact with the road surface when the tire is assembled on the applicable rim, filled with the prescribed internal pressure, and rolled under the prescribed load (hereinafter also referred to as the "maximum load condition"). In addition, the "tread edge" means the outer edge of the tread surface in the tire width direction.

As used herein, the "sipe" is defined as a sipe with a width of 1 mm or less in the area of 50% or more of the depth of the sipe in the above reference condition. Here, the "depth of sipe" shall be measured perpendicular to the tread surface in the above reference condition, and the "width of sipe" shall be measured in a cross section perpendicular to the extending direction of the sipes at the tread surface, parallel to the tread surface, in the above reference condition. In addition, the "length in the extending direction of the sipe" refers to the length of the centerline consisting of a series of sipe widthwise center points on the tread surface in the reference condition. The distance and length, etc. associated with the sipe shall also be measured, with respect to the above centerline, in the developed view of the tread surface, unless otherwise noted.

In this embodiment, unless otherwise noted, the internal structure, etc. of the tire can be the same as that of a conventional tire. As an example, the tire may have a pair of bead portions, a pair of sidewall portions connected to the pair of bead portions, and a tread portion disposed between the pair of sidewall portions. Also, the tire may have a carcass that straddles toroidally between the pair of bead portions, and a belt disposed on the outer side of the crown portion of the carcass in the tire radial direction.

In the following, the tire is described as one whose lumen is filled with air and mounted on a vehicle such as a passenger car. However, the tire lumen may be filled with a fluid other than air, and the tire may be mounted on a vehicle other than a passenger car.

Hereinafter, a tire 1 according to an embodiment of the present disclosure will be described with reference to the drawings.

First Embodiment

FIG. 1 is a schematic developed view of the tread pattern of the tire 1 (1A) according to the first embodiment of this disclosure. In FIG. 1, a part of the tread surface 2 of the tire 1A is illustrated as a developed view from the outer side in the tire radial direction to a plane (as a developed view of the tread surface 2).

As illustrated in FIG. 1, the tire 1A has, on the tread surface 2, one or more (four in the illustrated example) circumferential main grooves 3 (3A, 3B, 3C, 3D) extending in the tire circumferential direction; and a plurality (five in the illustrated example) of land portions 4 (4A, 4B, 4C, 4D, 4E) which are defined by the circumferential main grooves 3 adjacent to each other in the tire width direction of the one or more circumferential main grooves 3, or by the circumferential main groove 3 (3A or 3D) and the tread edge TE. In this embodiment, the circumferential main grooves 3A and 3B are located in one half of the tire widthwise position with the tire equatorial plane CL as a boundary, and the other circumferential main grooves 3C and 3D are located in the other half of the tire widthwise position with the tire equatorial plane CL as a boundary. Thus, in this embodiment, one land portion 4 (4C) is arranged on the tire equatorial plane CL and two land portions 4 (4A and 4B, 4D and 4E) are arranged on each of the tire widthwise half.

The number of circumferential main grooves 3 in the tire 1A may be any number other than four. Depending on the number of circumferential main grooves 3, the number of land portions 4 in the tire 1A may be any number other than five. Furthermore, the tire 1A may be configured without circumferential main grooves 3 on the tread surface 2. In such a case, the tire 1A may have one land portion 4 on the tread surface 2, which is defined by both tread edges TE in the tire width direction.

In the illustrated example, the circumferential main grooves 3 all extend along the tire circumferential direction. As used herein, "the straight line X extends along the direction Y" means that the straight line X extends parallel to the direction Y, or that the straight line X extends approximately parallel to the direction Y. The "extending direction of the straight line X is approximately parallel to the direction Y" means, for example, that the angle between the extending direction of the straight line X and the direction Y is within 5 degrees or less. However, at least one circumferential main groove 3 may extend at an angle greater than 5 degrees with respect to the tire circumferential direction. In the illustrated example, all of the circumferential main grooves 3 extend in a straight line along the tire circumferential direction, however at least one of the circumferential main grooves 3 may have a shape other than a straight line, such as zigzag or curved, either entirely or partially.

The width of the circumferential main grooves 3 is not limited, as it depends on the number of circumferential main grooves 3, but may be 4 to 15 mm, for example. The width of the circumferential main groove 3 is measured as the opening width perpendicular to the extending direction of the groove in the reference condition, when viewed from the outer side in the tire radial direction and developed on a flat surface. Similarly, the depth (maximum depth) of the circumferential main groove 3 is not limited, but may be 6 to 20 mm, for example. The width of the circumferential main groove 3 does not have to be constant over the extending direction of the circumferential main groove 3 and may differ from each other depending on the location of the tread surface 2 where the circumferential main groove 3 is provided.

In the tire 1A, each land portion 4 is divided into a plurality of block land portions 6 by one or more width direction grooves 5 that completely cross the land portion 4 and extend in the tire width direction.

In the illustrated example, all of the width direction grooves 5 completely cross the land portion 4 and extend in the tire width direction. For example, within the illustration, the land portion 4C is divided into three block land portions 6A, 6B and 6C adjacent to each other in the tire circumferential direction by two width direction grooves 5A and 5B adjacent to each other in the tire circumferential direction. As used herein, "the straight line X extends in the direction Y" means that the straight line X has at least a Y-direction component. That is, "the straight line X extends in the direction Y" means that the straight line X may extend along the direction Y, or the straight line X may extend at a predetermined angle with respect to the direction Y. The width direction groove 5 may extend in a straight line in the tire circumferential direction, or it may extend in a shape other than a straight line, such as zigzag or curved. The width direction groove 5 may extend along the tire width direction, or it may extend at an angle greater than 0° and less than 45° with respect to the tire width direction, as in the illustrated example.

The width (opening width) of the width direction groove 5 is not particularly limited, as it depends on the number of width direction grooves 5, but may be 2 to 10 mm, for example. The width of the width direction groove 5 is measured as the opening width perpendicular to the extending direction of the groove in the reference condition, when viewed from the outer side in the tire radial direction and developed on a flat surface. Similarly, the depth (maximum depth) of the width direction groove 5 is not limited, but may be 5 to 20 mm, for example. However, the width of the width direction groove 5 is not limited in any way as long as it is large enough to prevent the block land portions adjacent in the tire circumferential direction from coming into contact with each other when the tire is grounded in the reference condition. In addition, the width of the width direction groove 5 does not have to be constant over the extending direction of the width direction groove 5 and may differ from each other depending on the location of the land portion 4 where the width direction groove 5 is provided.

The number of width direction grooves 5 across each of the land portions 4 may be any number. Depending on the number of width direction grooves 5, the number of block land portions 6 included in the land portion 4 may be any number. Furthermore, the land portion 4 may be configured not to be crossed by the width direction groove 5, i.e., the land portion 4 may be configured as a rib-shaped land portion that continues without interruption in the tire circumferential direction.

The land portion 4 comprises a sipe unit 8 consisting of a pair of sipes 7. More specifically, a sipe unit 8 consisting of a pair of sipes 7A and 7B is arranged in the block land portion 6 included in the land portion 4. Hereafter, when the sipes 7A and 7B are not specifically distinguished, they will be referred to collectively as simply sipe 7.

Each of the pair of sipes 7A and 7B that constitutes the sipe unit 8 extends such that both ends in the extending direction of the sipe 7 terminate within the land portion 4. More specifically, each of the pair of sipes 7A and 7B extends such that both ends in the extending direction of the sipe 7 terminate within the block land portion 6. In other words, the sipe 7 does not have an open end that opens into the circumferential main groove 3 that defines the land portion 4 or the width direction groove 5. In this way, since the sipe 7 does not have an open end and the block land portion 6 around the sipe 7 is connected, the block land portion 6 becomes difficult to collapse around the sipe 7, and the rigidity of the block land portion 6 is improved.

Figure 2:
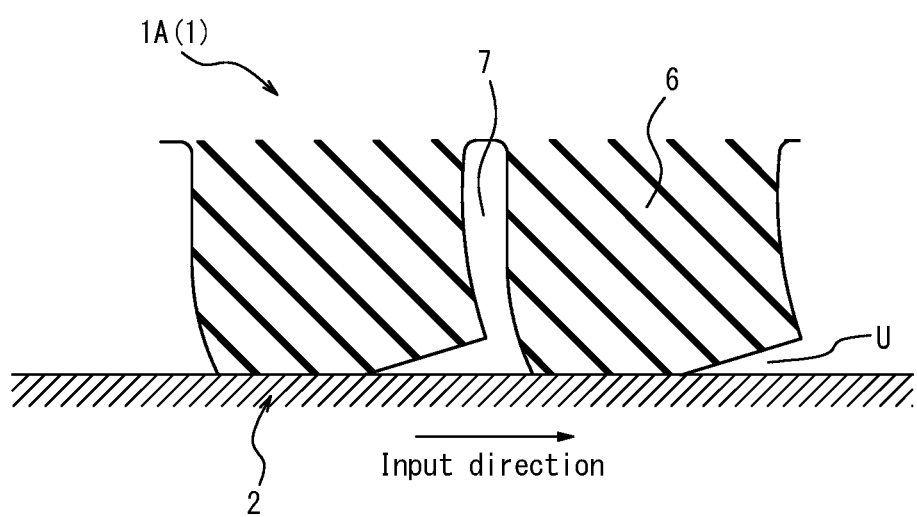
FIG. 2 schematically illustrates the lifting of the block land portion around a sipe.

Generally, as illustrated in FIG. 2, when an external force such as frictional force is input from the road surface to the contact patch of the tread surface 2 that is in contact with the road surface, the block land portion 6 collapses into the void side of the sipe 7. This causes to the block land portion 6 around the sipe 7 the lifting U from the road surface. FIG. 2 schematically illustrates the lifting U of the block land portion 6 around the sipe 7. FIG. 2 illustrates a cross-sectional view in the tire circumferential direction of the tire 1A, cut along the tire circumferential direction. When external force is applied to the tire 1A in the direction indicated by the arrow in FIG. 2, the lifting occurs in the block land portion 6 on the side where the external force is applied, with the sipe 7 as the boundary. In contrast, when the block land portion 6 around the sipe 7 is connected to each other, since the block land potion 6 around the sipe 7 restrains each other and can control the lifting U of the block land portion 6 around the sipe 7 caused by the input of external force from the road surface, thereby the footprint area of the tire 1A at the time of the input of external force can be increased. This prevents the reduction in rigidity of the land portion of the tire 1A due to the arrangement of the sipes 7 on the block land portion 6, which in turn prevents the reduction in the footprint area of the tire 1A. Therefore, the on-ice gripping performance of the tire 1A is improved.

Referring again to FIG. 1, each of the pair of sipes 7A and 7B that constitutes the sipe unit 8 extends in a straight line at an angle with respect to the tire width direction in FIG. 1, i.e., in the developed view of the tread surface 2.

Figure 3:
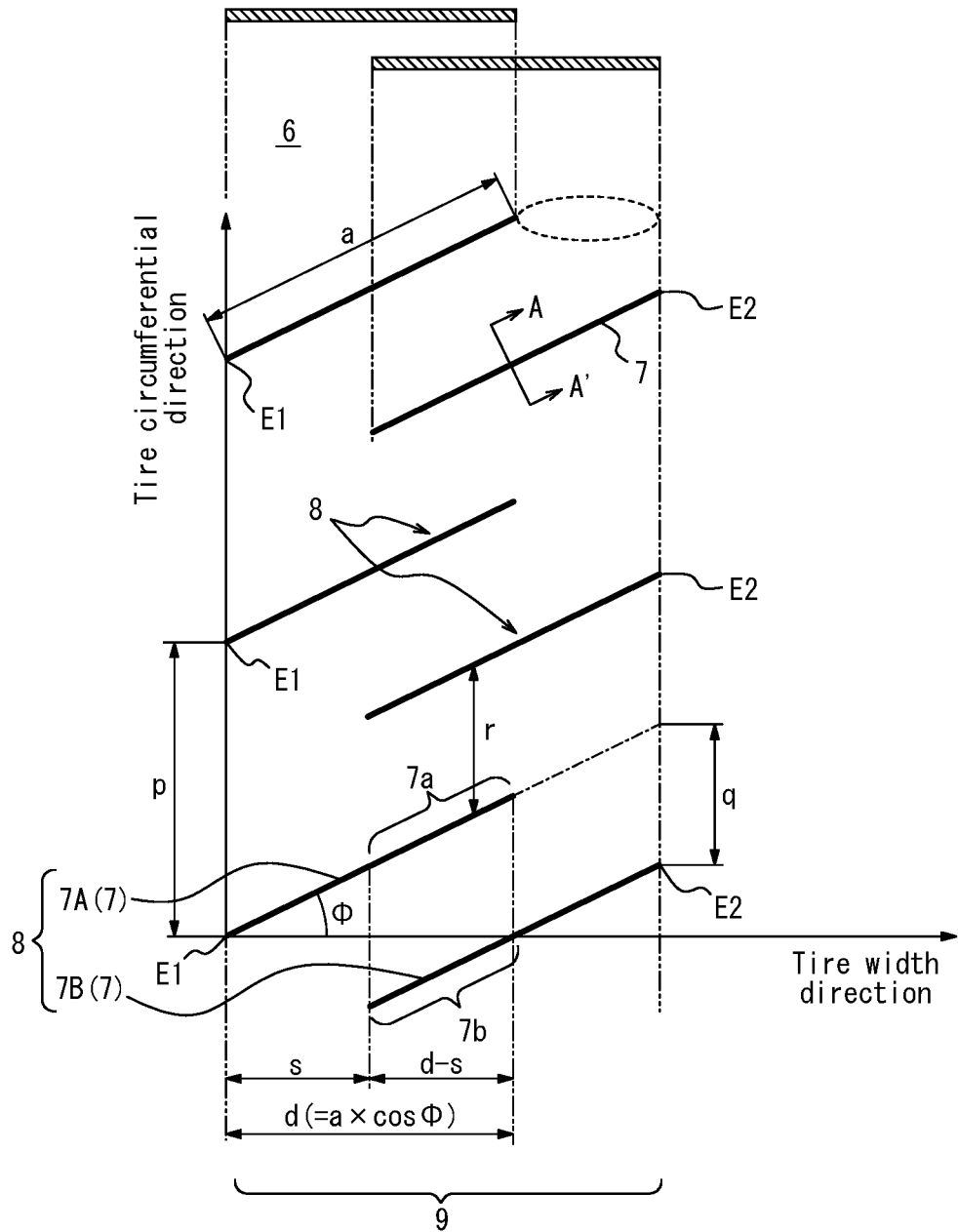
FIG. 3 schematically illustrates the arrangement of sipe units depicted in FIG. 1.

The configuration of the sipe unit 8 is explained below with reference to FIGS. 3 and 4. FIG. 3 schematically illustrates the arrangement of the sipe unit 8 depicted in FIG. 1. FIG. 4 is a cross-sectional view illustrating the cross section (cross section perpendicular to the extending direction of the sipe 7) by the line A-A' indicated in FIG. 3. In FIG. 3, each of the pair of sipes 7A and 7B that constitute the sipe unit 8 extends in a straight line such that the angle φ with respect to the tire width direction satisfies 0°<φ<45°. In this way, the sipes 7A and 7B are inclined to the tire width direction, which allows the sipes 7A and 7B to contribute not only to the improvement of braking and driving force in the tire circumferential direction, but also to the improvement of lateral gripping performance (turning force) in the tire width direction. In particular, by setting φ<45°, the tire widthwise component of the sipe 7 is larger than the tire circumferential component thereof, and the sipe 7 can contribute to the improvement of braking and driving force in the tire circumferential direction, which is most important for safety. In this embodiment, the sipes 7A and 7B extend parallel to each other, however, the sipes 7A and 7B may extend at different angles with respect to the tire width direction.

In FIG. 3, the length of the sipe 7 in the extending direction thereof is indicated by a. The length a of the sipe 7 in the extending direction thereof is, for example, between 3 and 15 mm. The length a of the sipe 7 in the extending direction thereof is preferably between 3 and 10 mm, and more preferably between 3 and 5 mm. The length a of the sipe 7 may be defined according to the depth (maximum depth) h of the sipe 7. Specifically, the length a of the sipe 7 may be determined according to the depth h within the range where the length d of the sipe 7 in the tire width direction (d=a×cos φ) and the depth h of the sipe 7 satisfy d×h≤150 mm². The length a of the sipe 7 is preferably defined within the range satisfying d×h≤100 mm², and more preferably d×h≤50 mm². The depth h of the sipe 7 may be, for example, 3 mm or more. The depth h of the sipe 7 may be 6.7 mm, for example.

Figure 4A:
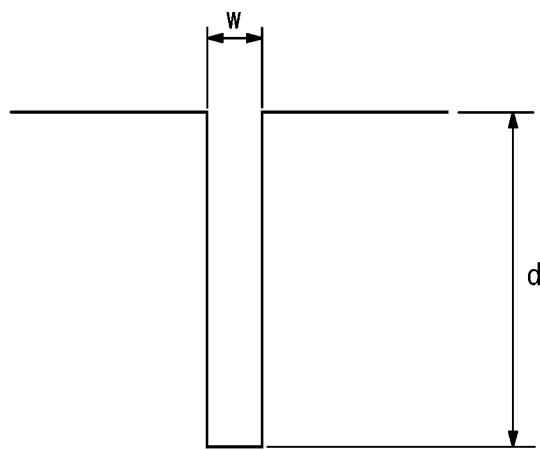
FIG. 4A is a cross-sectional view illustrating the cross section according to the line A-A' indicated in FIG. 3.
Figure 4B:
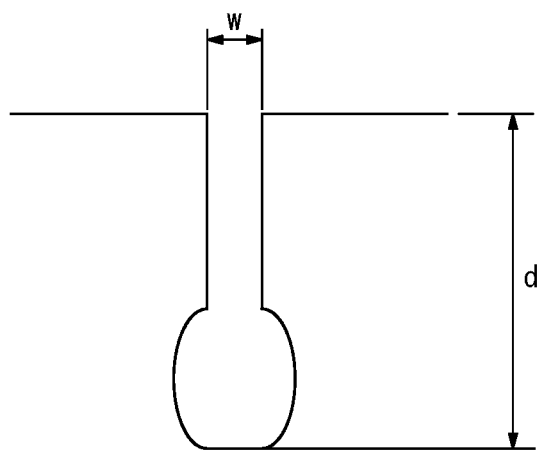
FIG. 4B is a cross-sectional view illustrating the cross section according to the line A-A' indicated in FIG. 3.

Referring to FIG. 4, the cross-sectional shape of the sipe 7 in a cross section perpendicular to the extending direction thereof at the tread surface 2 is described. In this embodiment, the cross-sectional shape of the sipe 7 in a cross section perpendicular to the extending direction thereof is approximately rectangular, as illustrated in FIG. 4A. In the sipe 7 illustrated in FIG. 4A, the width w of the sipe 7 is 1 mm or less as described above, and may be 0.4 mm, for example. However, the cross-sectional shape of the sipe 7 in a cross section perpendicular to the extending direction thereof may be other than rectangular. For example, the sipe 7 may be shaped with the groove bottom portion bulging in a cross section perpendicular to the extending direction of the sipe 7, as illustrated in FIG. 4B. In addition, for example, the sipe 7 may be rounded at the bottom in a cross section perpendicular to the extending direction of the sipe 7. For example, in the cross section of the sipe 7 perpendicular to the extending direction thereof illustrated in FIG. 4A, the bottom portion of the sipe 7 may be R-chamfered at both ends in the width direction of the sipe 7, or the bottom portion of the sipe 7 may be semicircular. In the sipe 7 illustrated in FIG. 4B, the width w of the sipe 7 may be 0.4 mm, for example, in the area of 50% or more of the depth of the sipe 7.

Referring again to FIG. 3, the sipe 7B is displaced from the sipe 7A by an offset s in the tire width direction and by an offset q in the tire circumferential direction. The offset s in the tire width direction of the sipes 7A and 7B may be defined, for example, in the range satisfying s≥1.5 mm.

The pair of sipes 7A and 7B that constitute the sipe unit 8 are opposed to each other in the tire circumferential direction only in part in the tire width direction. Here, "a line segment X and a line segment Y are opposed to each other in the direction Z" means that the line segment X and the line segment Y are separated from each other in the direction Z and that each of the ends of line segment Y is located on two straight lines extended along the direction Z from each end of the line segment X. However, "the sipes 7A and 7B are opposed to each other in the tire circumferential direction only in part in the tire width direction" shall include the case where only the end points of sipes 7A and 7B respectively are located on a straight line extending along the tire circumferential direction. In this embodiment, the sipes 7A and 7B are offset by s in the tire width direction. In FIG. 3, the part 7a in the tire width direction of the sipe 7A and the part 7b in the tire width direction of the sipe 7B are opposed to each other in the tire circumferential direction. Here, the length d in the tire width direction of each of the sipes 7A and 7B (d=a×cos φ) and the offset s in the tire width direction of the sipes 7A and 7B satisfy d−s≥0. As a result, when the pair of sipes 7A and 7B in the sipe unit 8 are projected along the tire circumferential direction, at least one of the sipes 7A and 7B extends unbroken across the length of the sipe unit 8 in the tire width direction, as indicated by the shaded shading in FIG. 3. Therefore, by increasing the length of the sipe unit 8 included in the tire width direction within the range where d−s≥0 is satisfied without changing the length of each of the sipes 7A and 7B that constitute the sipe unit 8, the sipe unit 8 can provide edge effect and water removing effect in a wider range while maintaining the sipe density in the block land portion 6. This improves the on-ice gripping performance of the tire 1A.

Referring again to FIG. 1, in the land portion 4, a plurality of sipe units 8 are spaced apart from each other and repeatedly arranged in the tire circumferential direction to form a sipe unit row 9. In the illustrated example, in one block land portion 6, three sipe units 8 are arranged repeatedly in the tire circumferential direction to form a sipe unit row 9. However, the number of sipe units 8 that constitute one sipe unit row 9 may be any number of two or more.

In FIG. 3, the plurality of sipe units 8 that constitute the sipe unit row 9 are arranged repeatedly at a pitch p in the tire circumferential direction. In this embodiment, the plurality of sipes 7 arranged on the block land portion 6 extend parallel to each other in the developed view of the tread surface 2. Here, when the distance in the tire circumferential direction between adjacent sipe units 8 in the tire circumferential direction in the sipe unit row 9 is denoted as the distance r between units, the distance r between units is indicated by r=p−q. In particular, when the pitch p of the sipe unit 8 that constitute the sipe unit row 9 and the offset q in the tire circumferential direction of the sipes that constitute the sipe unit 8 is q=p/2, r=q holds true, then all the sipes 7 in the sipe unit row 9 are equally spaced in the tire circumferential direction. Therefore, the sipe density in the tire circumferential direction in the block land portion 6 can be made uniform by setting q preferably in the range of (p/2)×0.8 to (p/2)×1.2, and more preferably to p/2. This allows the tread surface 2 to contact the road surface more uniformly and to equalize the distribution of the ground pressure applied to the ground contact patch of the tread surface 2, thereby increasing the footprint area of the tire 1A.

Figure 5:
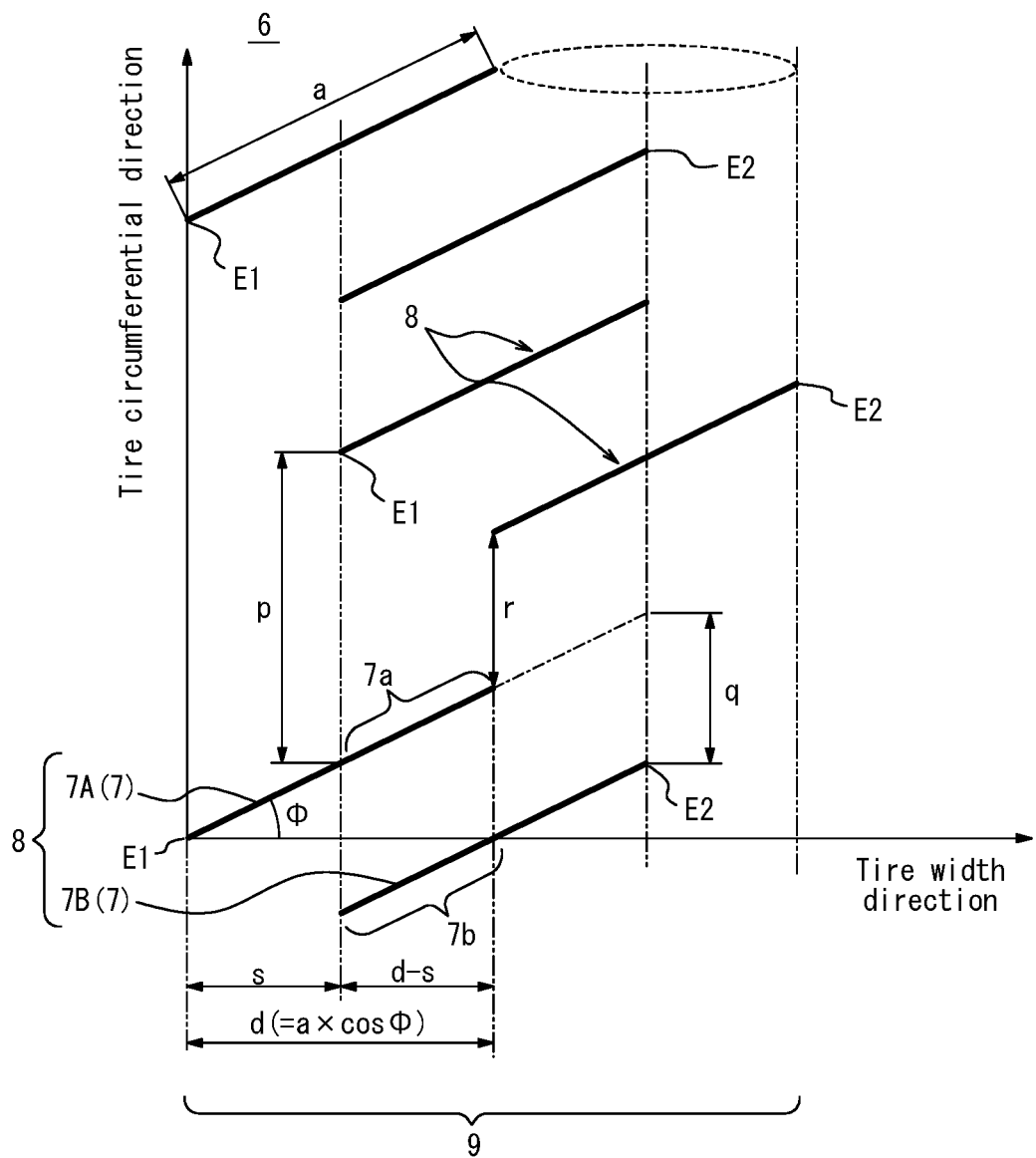
FIG. 5 schematically illustrates a different arrangement of sipe units than in FIG. 3.

The plurality of sipe units 8 that constitute the sipe unit row 9 are preferably arranged so that both ends in the tire width direction of each sipe unit are aligned on a straight line extending along the tire circumferential direction, respectively. Specifically, in FIG. 3, both ends E1 and E2 in the tire width direction of the plurality of sipe units 8 that constitute the sipe unit row 9 are aligned on a straight line extending along the tire circumferential direction, respectively. This reduces the blank area (the area enclosed by the dashed line in the figure) where no sipes 7 are provided within the area of the block land portion 6 where the sipe unit row 9 is arranged. As a comparison, FIG. 5 illustrates an arrangement of sipe units 8, which is different from that illustrated in FIG. 3. In FIG. 5, both ends in the tire width direction of each of the plurality of sipe units 8 that constitute the sipe unit row 9 are not aligned on a straight line extending along the tire circumferential direction, respectively. Comparing FIGS. 3 and 5, the area enclosed by the dashed line in FIG. 3 is smaller than the area enclosed by the dashed line in FIG. 5. In this way, by arranging both ends in the tire width direction of the plurality of sipe units 8 that constitute the sipe unit row 9 on a straight line extending along the tire circumferential direction, the blank area where no sipes 7 are provided can be reduced within the area of the block land portion 6 where the sipe unit row 9 is arranged. However, the arrangement of the sipe units 8 may be as illustrated in FIG. 5.

Referring again to FIG. 1, the land portion 4 comprises a plurality of sipe unit rows 9 arranged side-by-side in the tire width direction. In the illustrated example, in each of the block land portions 6 of the land portions 4A and 4E respectively, two sipe unit rows 9 are arranged side by side in the tire width direction. Also, in each of the block land portions 6 of the block land portions 4B, 4C and 4D respectively, four sipe unit rows 9 are arranged side by side in the tire width direction. However, the number of sipe unit rows 9 arranged in one block land portion 6 may be any number.

Figure 6:
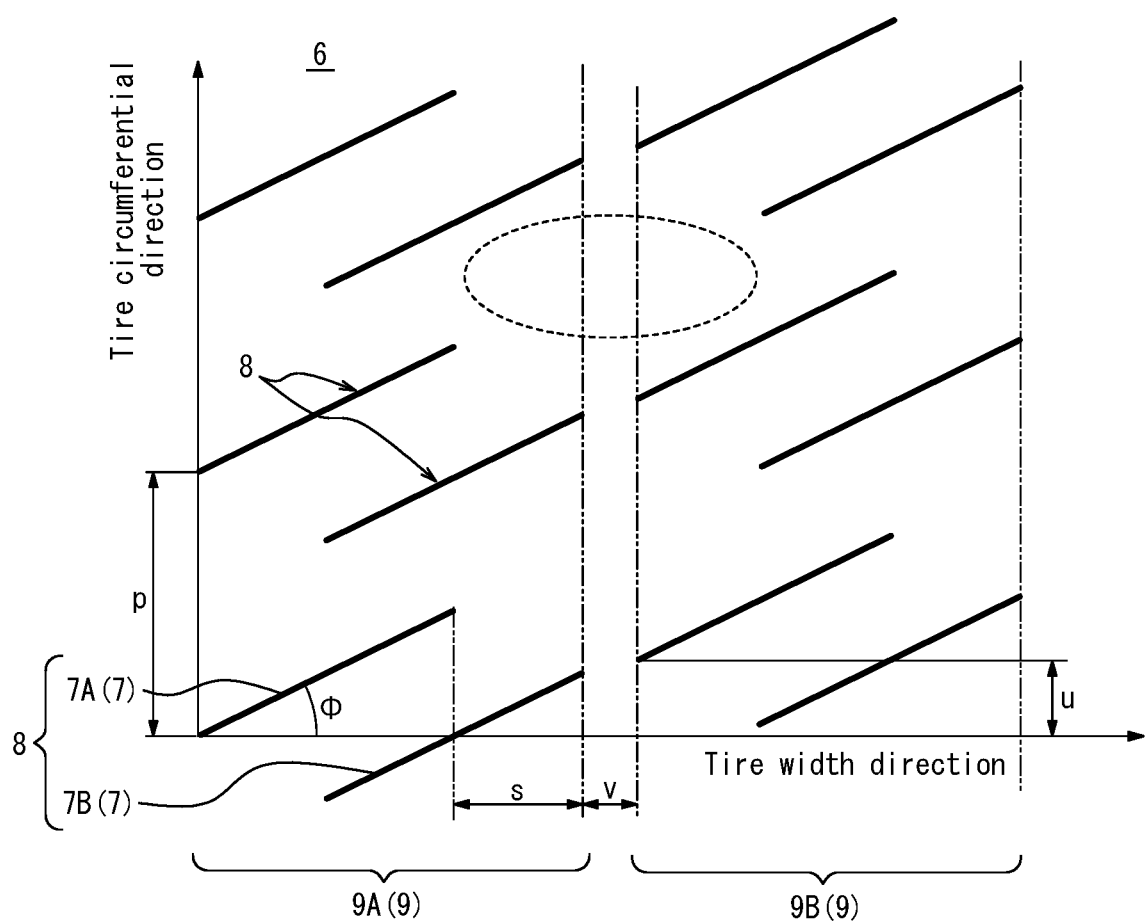
FIG. 6 schematically illustrates the arrangement of a plurality of sipe unit rows in the first embodiment.

The arrangement of a plurality of sipe unit rows 9 in the first embodiment is described below with reference to FIG. 6. FIG. 6 schematically illustrates the arrangement of a plurality of sipe unit rows 9 in the first embodiment. In FIG. 6, two sipe unit rows 9A and 9B are arranged side by side in the tire width direction.

In the first embodiment illustrated in FIG. 6, a plurality of sipes 7 in two adjacent sipe unit rows 9A and 9B in the tire width direction extend at an angle with respect to the tire width direction, in the same direction between the sipe unit rows 9A and 9B. Specifically, among the plurality of sipe unit rows 9A and 9B, the plurality of sipes 7 in the first sipe unit row 9A extend toward one side in the tire width direction (right in the figure) while being inclined toward one side in the tire circumferential direction (up in the figure). Furthermore, the plurality of sipes 7 in the second sipe unit row 9B which is adjacent to the first sipe unit row 9A extend, as well as the plurality of sipes 7 included in the first sipe unit row 9A, toward the one side in the tire width direction (right in the figure) while being inclined toward the one side in the tire circumferential direction (up in the figure).

Thus, the plurality of sipes 7 included in the plurality of sipe unit rows 9 adjacent to each other in the tire width direction are arranged to extend in the same direction between the sipe unit rows 9, which makes it easier to arrange the blades for forming the sipes 7 in the mold during tire manufacturing and facilitates the fabrication of molds for the tire 1A.

In FIG. 6, the tire widthwise spacing between the adjacent sipe unit rows 9A and 9B in the tire width direction is indicated by v. Also, the offset in the tire circumferential direction of the adjacent sipe unit rows 9A and 9B in the tire width direction is indicated by u. The tire widthwise spacing v and the offset in the tire circumferential direction u may each be set to any value.

The tire widthwise spacing v is preferably −s to s (s>0). Here, the s is the offset in the tire width direction between the pair of sipes 7 that constitute the sipe unit 8. As illustrated in FIG. 6, the positive value of the tire widthwise spacing v means that the area between the two ends in the tire width direction of the sipe unit row 9A and the area between the two ends in the tire width direction of the sipe unit row 9B adjacent to the sipe unit row 9A in the tire width direction are spaced apart in the tire width direction by the spacing v in the tire width direction. On the other hand, the negative value of the tire widthwise spacing v means that the area between the two ends in the tire width direction of the sipe unit row 9A and the area between the two ends in the tire width direction of the sipe unit row 9B adjacent to the sipe unit row 9A in the tire width direction overlap in the tire width direction by the absolute value of the spacing v. By defining the tire widthwise spacing v in this manner, the blank area (the area enclosed by the dashed line in the figure) where no sipes 7 are provided is reduced within the area of the block land portion 6 where the adjacent sipe unit rows 9A and 9B in the tire width direction are arranged.

More preferably, the tire widthwise spacing v is set to 0 and the offset in the tire circumferential direction u is $(d+s) \times \tan \varphi$. Here, $\varphi$ is the angle between each of the pair of sipes 7 that constitute the sipe unit 8 and the tire width direction, d is the length of the sipe 7 in the tire width direction, and s is the offset in the tire width direction between the pair of sipes 7 that constitute the sipe unit 8. The arrangement of the sipe unit rows 9, when the tire widthwise spacing v is 0 and the offset in the tire circumferential direction u is $(d+s) \times \tan \varphi$, is schematically illustrated in FIG. 7.

Figure 7:
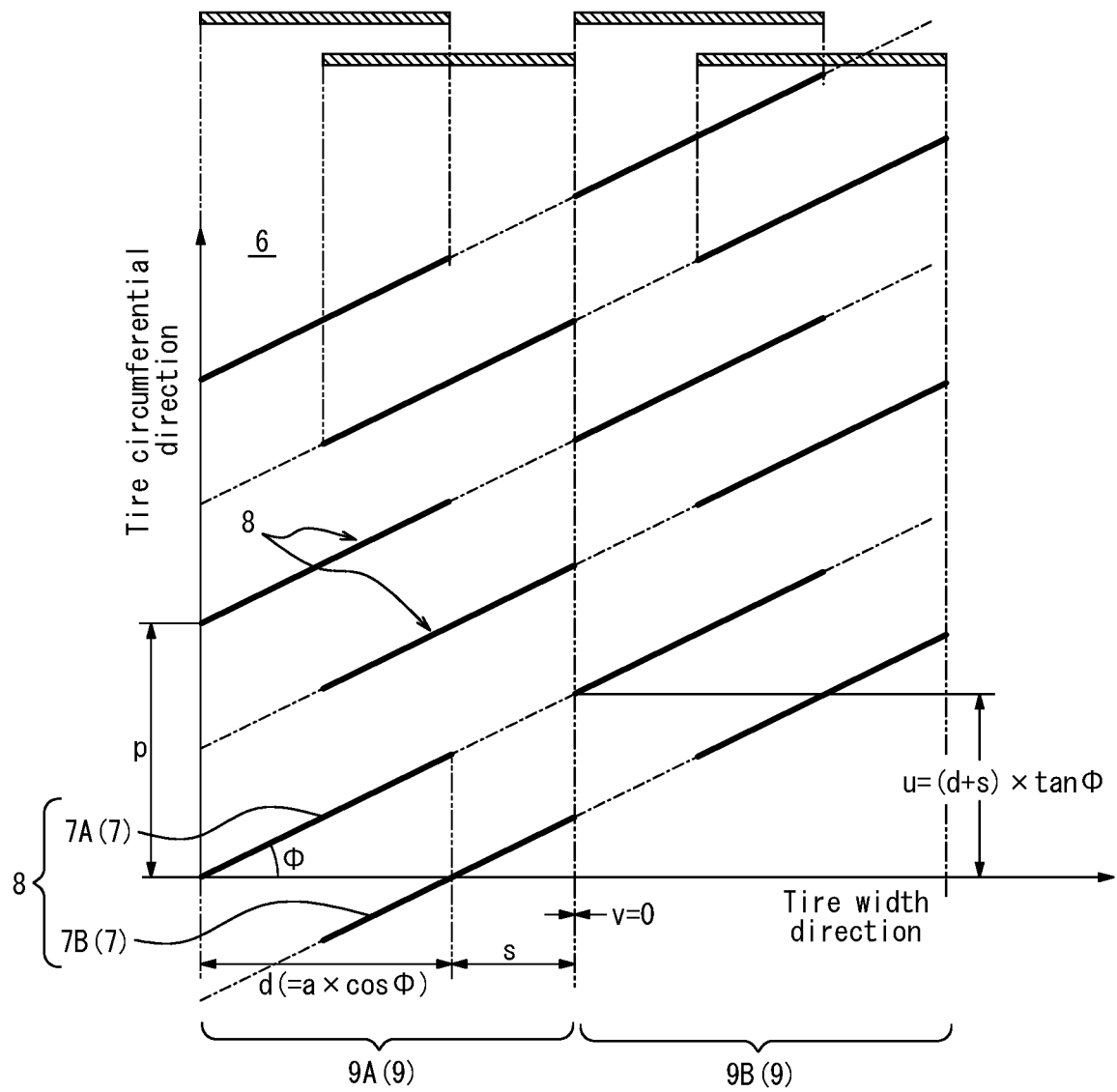
FIG. 7 schematically illustrates the arrangement of sipe unit rows when the tire widthwise spacing v is 0 and the tire circumferential offset u is (d+s)×tan φ.

By setting the tire widthwise spacing v to 0, the tire widthwise components of the plurality of sipes 7 are continuously arranged without gaps in the tire width direction, when the plurality of sipes 7 aligned in the tire width direction are projected along the tire circumferential direction, as illustrated by the shaded shading in FIG. 7. This allows the sipes 7 to be distributed evenly without gaps across the multiple sipe unit rows 9, thereby improving the edge effect and water removal effect in the block land portion 6. In addition, the sipe density in the block land portion 6 can be made uniform by distributing the sipes 7 evenly without gaps across the multiple sipe unit rows 9. This allows the tread surface 2 to contact the road surface more uniformly and the distribution of the ground pressure applied to the contact patch of the tread surface 2 to be equalized, thereby increasing the footprint area of the tire 1A.

In FIG. 7, each of the plurality of sipes 7 in the second sipe unit row 9B extends over an extension line of any of the sipes 7 in the first sipe unit row 9A. As a result, in the block land portion 6, the plurality of sipes 7 are arranged in a straight line in the tire width direction. Because of this, by setting u preferably in the range of $((d+s) \times \tan \varphi) \times 0.8$ to $((d+s) \times \tan \varphi) \times 1.2$, and more preferably to $(d+s) \times \tan \varphi$, water captured in the voids of the sipes 7 is drained along the plurality of sipes 7 which are arranged in a straight line, toward the tire width direction, thereby improving the on-ice gripping performance on the land portion 4. Furthermore, the plurality of sipes 7 in the adjacent sipe unit rows 9A and 9B are aligned in the same straight line, which facilitates the fabrication of molds with blades for forming the sipes 7.

Referring again to FIG. 1, twelve sipes 7 are arranged in each of the block land portions 6 of the land portions 4A and 4E respectively, and twenty-four sipes 7 are arranged in each of the block land portions 6 of the land portions 4B, 4C, and 4D respectively. However, the number of sipes 7 arranged in one block land portion 6 may be any number.

For example, the number of sipes 7 arranged in the block land portion 6 may be determined based on the sipe density in the tire circumferential direction SD. The sipe density in the tire circumferential direction SD is a measure of the density in the tire circumferential direction of transverse sipes that completely cross the block land portion 6. If the equivalent length in the tire circumferential direction of the block land portion 6 which is obtained by dividing the outer contour area of the block land portion 6 ($mm^2$) by the maximum width BW is BL (mm), and the number of transverse sipes which are provided to completely cross the block land portion 6 is N', the average sipe spacing in the tire circumferential direction is expressed as BL/(N'+1). The sipe density SD in the tire circumferential direction is expressed as the reciprocal of the average sipe spacing by the following formula (1).

$$SD = (N' + 1)/BL \qquad (1)$$

The "outer contour area" of the block land portion 6 is the area enclosed by the outer contour of the block land portion 6 in the expanded view of the tread surface 2. Therefore, even if non-grounded areas such as sipes, small holes, narrow grooves, etc. are arranged within the block land portion 6, the area that does not exclude the area of the sipes, small holes, narrow grooves, etc. are considered.

The following is a description of the method used to calculate the sipe density SD in this embodiment. For example, assume a diamond-shaped block land portion 6 provided with multiple sipes 7, as illustrated in the table providing sipe shapes in FIG. 14. First, if the number of sipes 7 in the block land portion 6 is n, the length of sipes 7 in the tire width direction is d (mm), and the maximum width of the block land portion 6 in the tire width direction is BW (mm), the number of equivalent sipes N is expressed as d×n/BW. Here, the number of equivalent sipes N is the number of sipes when the sipes 7 in this embodiment are converted to transverse sipes (equivalent sipes) that are provided to completely cross the block land portion 6. Furthermore, if the equivalent length in the tire circumferential direction of the block land portion 6 is BL (mm), the average sipe spacing in the tire circumferential direction is expressed as BL/(N+1). Here, the average sipe spacing in the tire circumferential direction is the spacing in the tire circumferential direction of the equivalent sipes in the block land portion 6, when the sipes 7 in this embodiment are converted to the equivalent sipes. The sipe density SD in the tire circumferential direction is expressed as the reciprocal of the average sipe spacing by the following formula (2).

$$SD = (N+1)/BL = ((d \times n/BW) + 1)/BL \qquad (2)$$

Note, that the number n of sipes 7 in the block land portion 6, the length d in the tire width direction of the sipes 7, the maximum width BW of the block land portion 6 in the tire width direction, and the outer contour area of the block land portion 6 are the values measured in the developed view of the tread surface 2.

For example, a plurality of sipes 7 may be arranged in the block land portion 6 so that the sipe density SD is 0.15 (1/mm) or more. This improves the on-ice gripping performance of the tire 1A.

Figure 8:
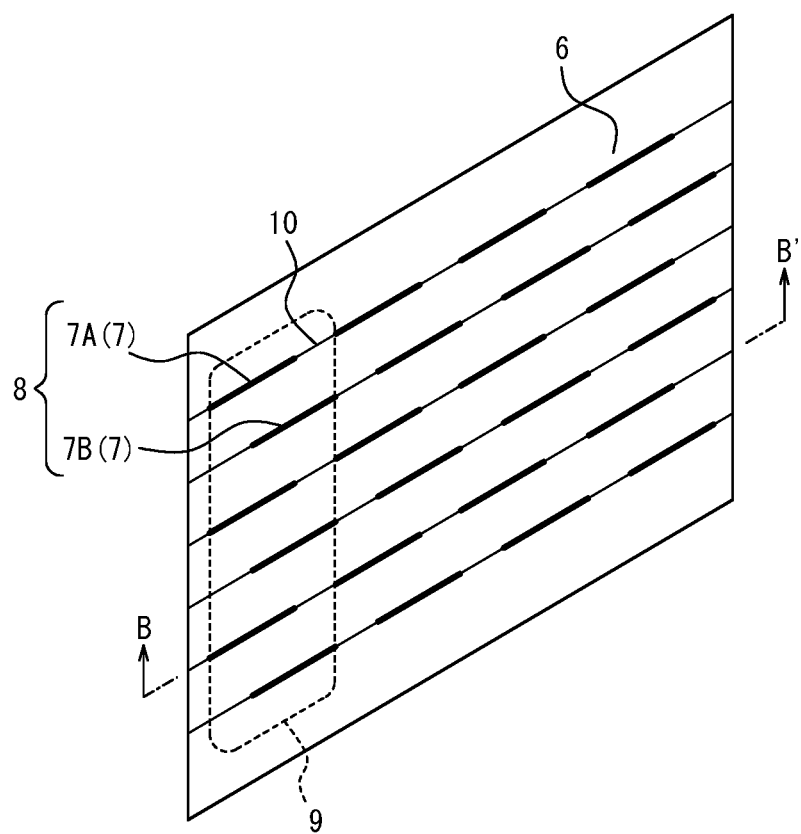
FIG. 8 schematically illustrates the arrangement of sipe units in which the sipes in the first embodiment are connected by shallow grooves.
Figure 9:
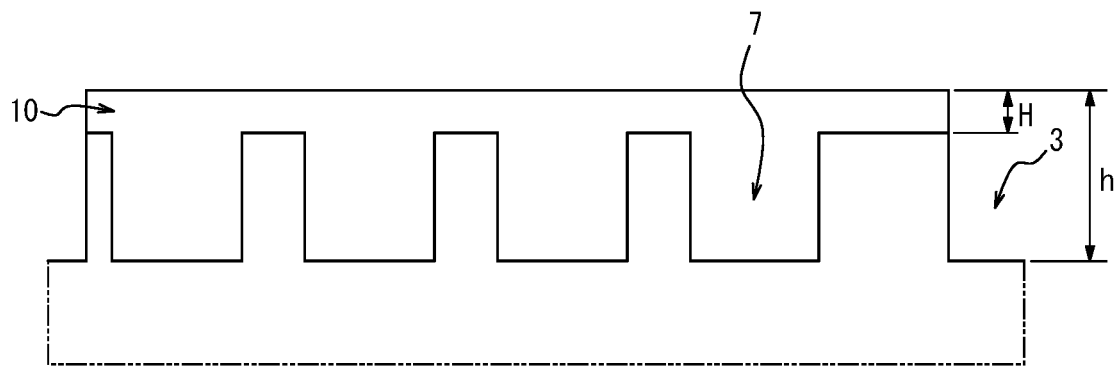
FIG. 9 is a cross-sectional view illustrating the cross section according to the line B-B' indicated in FIG. 8.

A plurality of sipes 7 may be connected in the block land portion 6 by a shallow groove 10. FIG. 8 schematically illustrates the arrangement of sipe units 8 in which the sipes 7 in the first embodiment are connected by the shallow grooves 10. The block land portion 6 illustrated in FIG. 8 corresponds, for example, to the block land portion 6B of the tire 1A illustrated in FIG. 1. In FIG. 8, four of sipe unit rows 9, aligned in the tire width direction, are arranged in the block land portion 6. In each of the sipe unit rows 9, three sipe units 8 are arranged repeatedly in the tire circumferential direction. In FIG. 8, the sipes 7, which are aligned in the tire width direction, are connected by the shallow groove 10 that completely crosses the block land portion 6. A cross-section (B-B' section) of the tire 1A that is cut along the extending direction of the shallow groove 10 illustrated in FIG. 8 is illustrated in FIG. 9. In FIG. 9, the depth (maximum depth) H of the shallow groove 10 may be defined according to the depth h of the sipe 7. For example, the depth H of the shallow groove 10 may be defined in the range of 5 to 60%, and preferably 5 to 20%, of the depth h of the sipe 7. For example, the depth h of the sipe 7 may be 6.7 mm and the depth H of the shallow groove 10 may be 0.7 mm. With this configuration, water captured in the voids of the sipes 7 is drained through the shallow grooves 10 toward the tire width direction, thereby improving the on-ice gripping performance in the block land portion 6.

Referring again to FIG. 1, the block land portion 6 of the tire 1A may be provided with sipes other than the sipe unit 8 described above. For example, in the illustrated example, the land portions 4A and 4E are provided with a plurality of zigzag-shaped sipes 11 extending in the tire width direction toward the tread edge TE. This improves drainage performance at the tread surface 2, and thus the on-ice gripping performance of the tire 1A.

Second Embodiment

Figure 10:
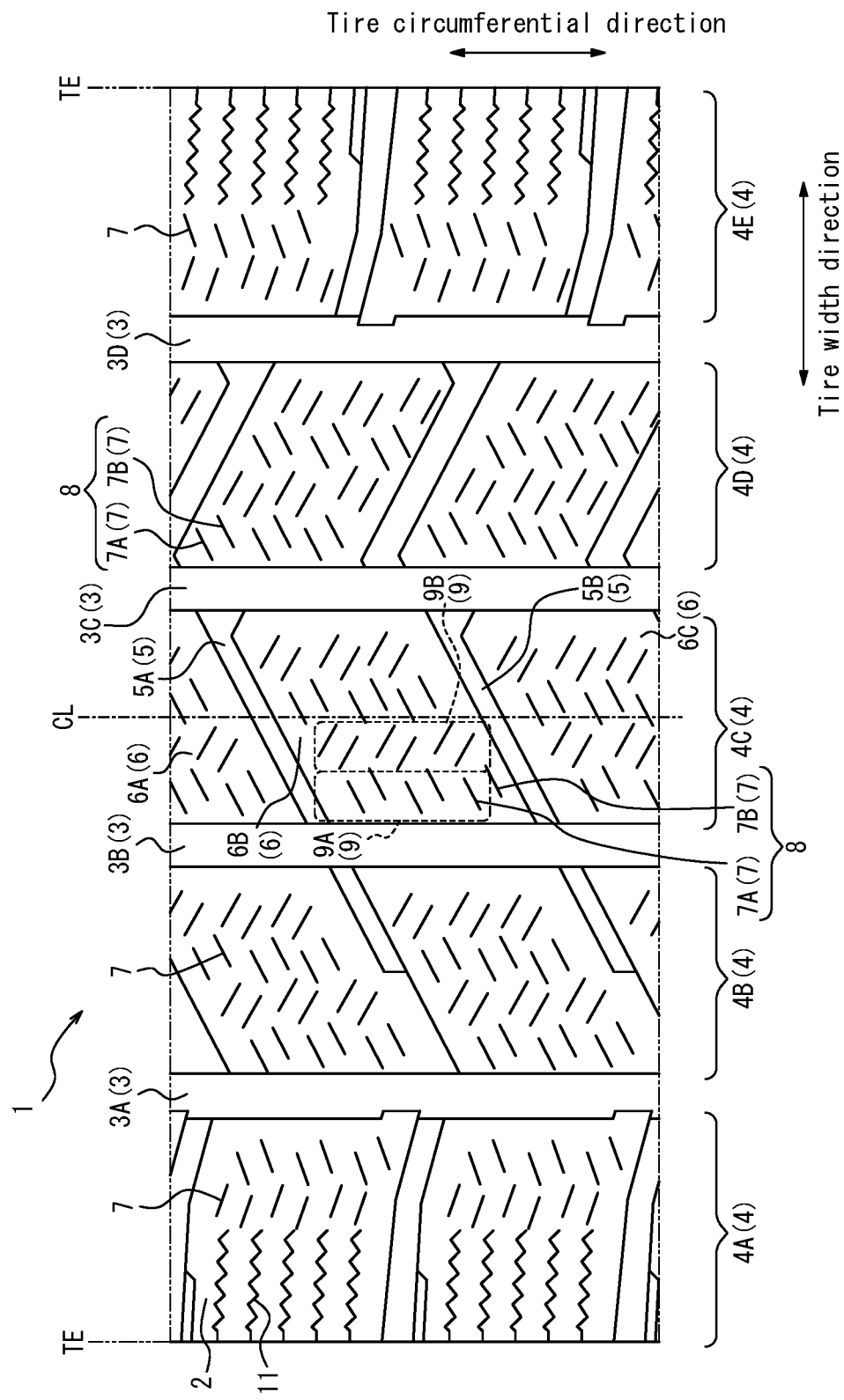
FIG. 10 is a schematic developed view of the tread pattern of the tire according to the second embodiment of this disclosure.

Hereinafter, a tire 1 (1B) according to the second embodiment of the present disclosure will be described with reference to FIG. 10. FIG. 10 is a schematic developed view of the tread pattern of the tire 1B according to the second embodiment of this disclosure. Hereafter, tires 1A and 1B will be referred to collectively as simply tire 1 when no particular distinction is made between them.

As illustrated in FIG. 10, the second embodiment differs from the first embodiment in that the plurality of sipes 7 in the two adjacent sipe unit rows 9 in the tire width direction are arranged to extend in different directions between the sipe unit rows 9. The following is a description of the second embodiment, focusing on the points where it differs from the first embodiment. Note, that parts having the same configuration as those in the first embodiment are given the same reference numerals.

As in the first embodiment, the tire 1B has, on the tread surface 2, one or more (four in the illustrated example) circumferential main grooves 3 (3A, 3B, 3C, 3D) extending in the tire circumferential direction; and a plurality (five in the illustrated example) of land portions 4 (4A, 4B, 4C, 4D, 4E) which are defined by the circumferential main grooves 3 adjacent to each other in the tire width direction of the one or more circumferential main grooves 3, or by the circumferential main groove 3 (3A or 3D) and the tread edge TE.

As in the first embodiment, in the tire 1B, each land portion 4 is divided into a plurality of block land portions 6 by one or more width direction grooves 5 that completely cross the land portion 4 and extend in the tire width direction. For example, within the illustration, the land portion 4C is divided into three block land portions 6A, 6B and 6C adjacent to each other in the tire circumferential direction by two width direction grooves 5A and 5B adjacent to each other in the tire circumferential direction.

The land portion 4 comprises a sipe unit 8 consisting of a pair of sipes 7, as in the first embodiment. More specifically, a sipe unit 8, consisting of a pair of sipes 7A and 7B, is arranged in the block land portion 6 included in the land portion 4.

As in the first embodiment, each of the pair of sipes 7A and 7B that constitutes the sipe unit 8 extends such that both ends in the extending direction of the sipe 7 terminate within the land portion 4. More specifically, each of the pair of sipes 7A and 7B extends such that both ends in the extending direction of the sipe 7 terminate within the block land portion 6.

As in the first embodiment, each of the pair of sipes 7A and 7B that constitutes the sipe unit 8 extends in a straight line at an angle with respect to the tire width direction in the developed view of the tread surface 2. Each of the pair of sipes 7A and 7B that constitute the sipe unit 8 extends in a straight line such that the angle φ with respect to the tire width direction satisfies 0°<φ<45°.

As in the first embodiment, the pair of sipes 7A and 7B that constitute the sipe unit 8 are opposed to each other in the tire circumferential direction only in part in the tire width direction.

As in the first embodiment, in the land portion 4, a plurality of sipe units 8 are repeatedly arranged in the tire circumferential direction to form a sipe unit row 9. In the illustrated example, in one block land portion 6, three sipe units 8 are arranged repeatedly in the tire circumferential direction to form a sipe unit row 9. The plurality of sipe units 8 that constitute the sipe unit row 9 are preferably arranged so that both ends in the tire width direction of each sipe unit are aligned on a straight line extending along the tire circumferential direction, respectively.

In the land portion 4, a plurality of sipe unit rows 9 are arranged side by side in the tire width direction. In the illustrated example, two sipe unit rows 9 are arranged side by side in the tire width direction in the block land portions 6 of the land portions 4A and 4E, respectively. Also, in the block land portions 4B, 4C and 4D, four sipe unit rows 9 are arranged side by side in the tire width direction in the block land portions 6 of the land portions 4B, 4C and 4D, respectively.

Figure 11:
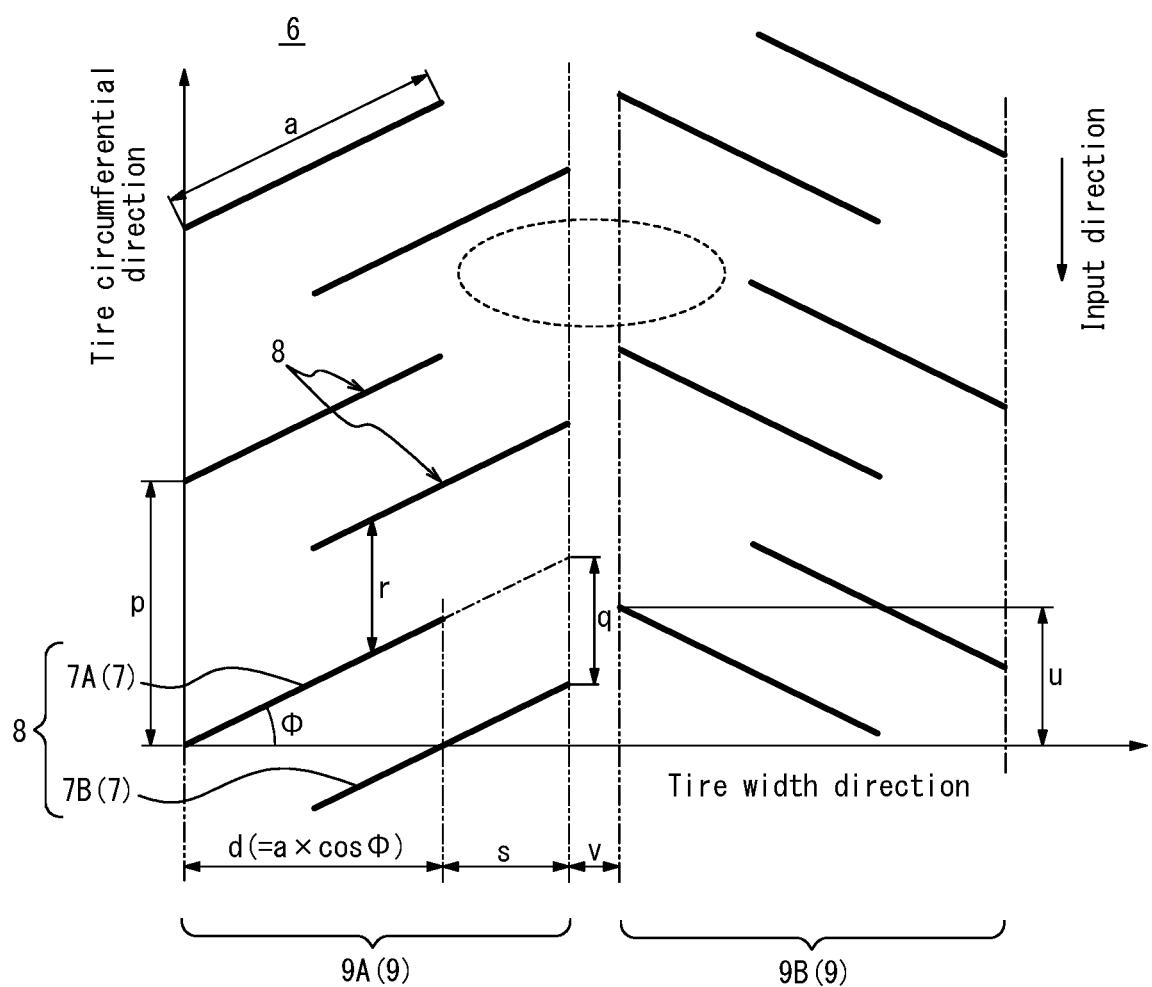
FIG. 11 schematically illustrates the arrangement of a plurality of sipe unit rows in the second embodiment.

Hereinafter, referring to FIG. 11, the arrangement of the plurality of sipe unit rows 9 in the second embodiment is described. FIG. 11 schematically illustrates the arrangement of the plurality of sipe unit rows in the second embodiment. In FIG. 11, two sipe unit rows 9A and 9B are arranged side by side in the tire width direction.

In the second embodiment illustrated in FIG. 11, unlike the first embodiment, a plurality of sipes 7 in two adjacent sipe unit rows 9A and 9B in the tire width direction extend at an angle with respect to the tire width direction, in a different direction between the sipe unit rows 9A and 9B. Specifically, among the plurality of the sipe unit rows 9A and 9B, the plurality of sipes 7 in the first sipe unit row 9A extend toward one side in the tire width direction (right in the figure) while being inclined toward one side in the tire circumferential direction (up in the figure). On the other hand, the plurality of sipes 7 in the second sipe unit row 9B which is adjacent to the first sipe unit row 9A extend toward the one side in the tire width direction (right in the figure) while being inclined toward the other side in the tire circumferential direction (down in the figure).

This arrangement of the sipe unit rows 9 prevents the block land portion 6 from collapsing when external force is input to the tire 1B, because the block land portion 6 is supported within the area where the adjacent sipe unit rows 9A and 9B are arranged. For example, when an external force is input in the direction indicated by the arrow in FIG. 11, the block land portion 6 around the sipes 7 in the sipe unit row 9A collapses toward the lower right in the drawing. On the other hand, the block land portion 6 around the sipes 7 in the sipe unit row 9B collapses toward the lower left in the drawing. In this way, when an external force is input to the tire 1B, the block land portion leans and collapses in different directions within the area where the adjacent sipe unit rows 9A and 9B in the tire width direction are arranged, so that the block land portion be supported within that area, and this makes the block land portion less likely to collapse. This increases the rigidity of the block land portion 6. In addition, when an external force in the tire circumferential direction is applied to the tread surface 2, the tire widthwise components of the external force applied to around the sipe unit rows 9A and 9B in the block land portion 6 cancel each other out, thereby preventing unexpected forces in the tire width direction from being applied to the tire 1B and reducing the impact on the steering stability of a vehicle equipped with the tire 1B.

In FIG. 11, the length of sipe 7 in the extending direction thereof is indicated by a, and the angle between the sipe 7 and the tire width direction is indicated by φ. In this embodiment, the plurality of sipes 7 in one sipe unit row 9 extend parallel to each other in the developed view of the tread surface 2. In the sipe unit 8, a pair of sipes 7A and 7B is displaced each other by an offset s in the tire width direction and by an offset q in the tire circumferential direction. In addition, the plurality of sipe units 8 that constitute the sipe unit row 9 are arranged repeatedly at a pitch p in the tire circumferential direction. Here, when the distance in the tire circumferential direction between adjacent sipe units 8 in the sipe unit row 9 is denoted as the distance r between units, the distance r between units is indicated by r=p−q.

In particular, when the pitch p of the sipe unit 8 that constitute the sipe unit row 9 and the offset q in the tire circumferential direction of the sipes that constitute the sipe unit 8 is q=p/2, r=q holds true, then all the sipes 7 in the sipe unit row 9 are equally spaced in the tire circumferential direction. Therefore, the sipe density in the tire circumferential direction in the block land portion 6 can be made uniform by setting q preferably in the range of (p/2)×0.8 to (p/2)×1.2, and more preferably to p/2. This allows the tread surface 2 to contact the road surface more uniformly and to equalize the distribution of the ground pressure applied to the ground contact patch of the tread surface 2, thereby increasing the footprint area of the tire 1B.

In FIG. 11, the tire widthwise spacing between the adjacent sipe unit rows 9A and 9B in the tire width direction is indicated by v. Also, the offset in the tire circumferential direction of the adjacent sipe unit rows 9A and 9B in the tire width direction is indicated by u.

The tire widthwise spacing v is preferably −s to s (s>0). Here, the s is the offset in the tire width direction between the pair of sipes 7 of the sipe unit 8 that constitute the sipe unit row 9. As illustrated in FIG. 11, the positive value of the tire widthwise spacing v means that the area between the two ends in the tire width direction of the sipe unit row 9A and the area between the two ends in the tire width direction of the sipe unit row 9B adjacent to the sipe unit row 9A in the tire width direction are spaced apart in the tire width direction by the spacing v in the tire width direction. On the other hand, the negative value of the tire widthwise spacing v means that the area between the two ends in the tire width direction of the sipe unit row 9A and the area between the two ends in the tire width direction of the sipe unit row 9B adjacent to the sipe unit row 9A in the tire width direction overlap in the tire width direction by the absolute value of the spacing v. By defining the tire widthwise spacing v in this manner, the blank area (the area enclosed by the dashed line in the figure) where no sipes 7 are provided is reduced within the area of the block land portion 6 where the adjacent sipe unit rows 9A and 9B in the tire width direction are arranged.

More preferably, the tire widthwise spacing v is set to 0 and the offset in the tire circumferential direction u is (d+s)×tan φ. Here, φ is the angle between each of the pair of sipes 7 that constitute the sipe unit 8 and the tire width direction, d is the length of the sipe 7 in the tire width direction, and s is the offset in the tire width direction between the pair of sipes 7 that constitute the sipe unit 8. The arrangement of the sipe unit rows 9 when the tire widthwise spacing v is 0 and the offset in the tire circumferential direction u is (d+s)×tan φ is schematically illustrated in FIG. 12.

Figure 12:
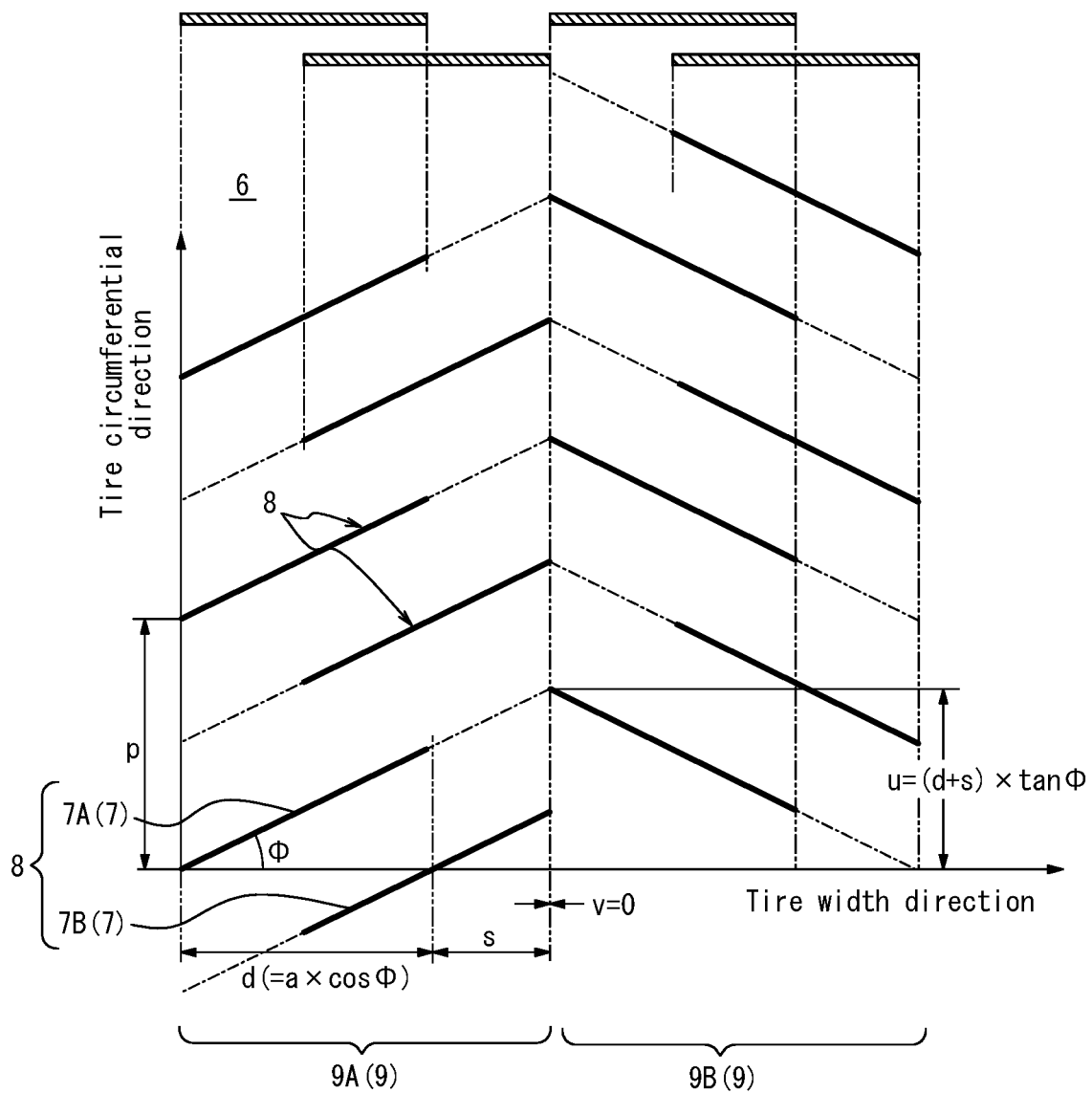
FIG. 12 schematically illustrates the arrangement of sipe unit rows when the tire widthwise spacing v is 0 and the tire circumferential offset u is (d+s)×tan φ.

By setting the tire widthwise spacing v to 0, the tire widthwise components of the plurality of sipes 7 are continuously arranged without gaps in the tire width direction, when the plurality of sipes 7 aligned in the tire width direction are projected along the tire circumferential direction, as illustrated by the shaded shading in FIG. 12. This allows the sipes 7 to be distributed evenly without gaps across the multiple sipe unit rows 9, thereby improving the edge effect and water removal effect in the block land portion 6. In addition, the sipe density in the block land portion 6 can be made uniform by distributing the sipes 7 evenly without gaps across the multiple sipe unit rows 9. This allows the tread surface 2 to contact the road surface more uniformly and the distribution of the ground pressure applied to the contact patch of the tread surface 2 to be equalized, thereby increasing the footprint area of the tire 1B.

In FIG. 12, each of the plurality of sipes 7 included in the second sipe unit row 9B extends to intersect with an extension line of any of the sipes 7 included in the first sipe unit row 9A. Therefore, when water captured in the void of one sipe 7 is drained from the sipe 7 along the extending direction of the sipe 7, the water is captured again in another sipe 7 extending to intersect with the extension line of the sipe 7, so that the on-ice gripping performance on the land portion 4 is less likely to be degraded.

In the tire 1B, the number of sipes 7 arranged in the block land portion 6 may also be determined based on the sipe density SD, as described above in the first embodiment. For example, a plurality of sipes 7 may be arranged in the block land portion 6 so that the sipe density SD is 0.15 (l/mm) or more. This prevents the reduction in rigidity of the block land portion 6 of the tire 1B due to the arrangement of the sipes 7 on the block land portion 6, which in turn prevents the reduction in the footprint area of the tire 1B. This improves the on-ice gripping performance of the tire 1B.

Figure 13:
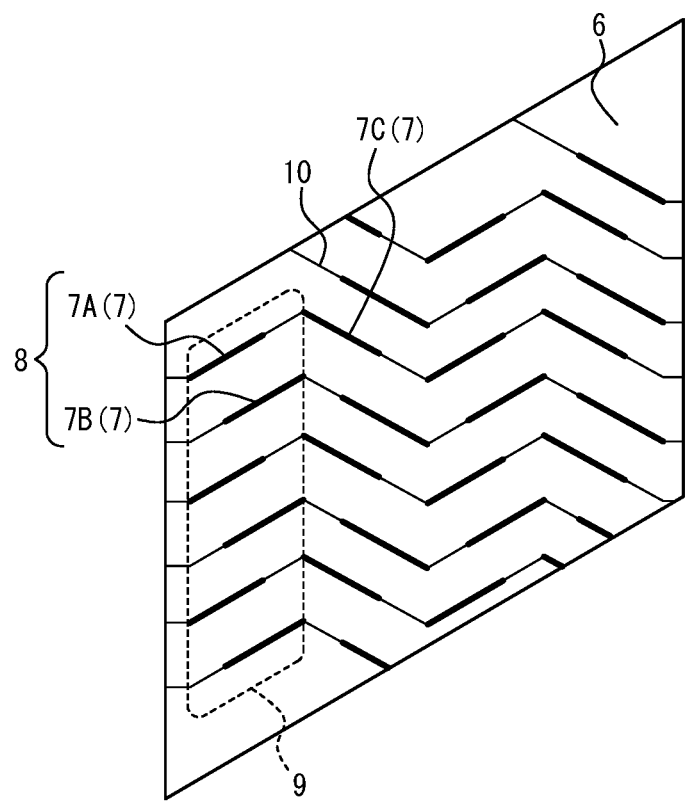
FIG. 13 schematically illustrates the arrangement of sipe units in which the sipes in the second embodiment are connected by shallow grooves.

In the tire 1B, as in the first embodiment, a plurality of sipes 7 may also be connected in the block land portion 6 by a shallow groove 10 that crosses the block land portion 6 in the tire width direction. FIG. 13 schematically illustrates the arrangement of sipe units 8 in which the sipes 7 in the second embodiment are connected by the shallow grooves 10. The block land portion 6 illustrated in FIG. 13 corresponds, for example, to the block land portion 6B of the tire 1B illustrated in FIG. 10. In FIG. 13, four rows of sipe unit rows 9 are arranged in the block land portion 6, aligned in the tire width direction. In the sipe unit row 9, three sipe units 8 are arranged repeatedly in the tire circumferential direction. Each of the sipes 7 (e.g., 7A in FIG. 13) is connected to a sipe 7 (7C in FIG. 13), one end of which is in an extension line along the extending direction of the sipe 7 (7A), by a shallow groove 10 that completely across the block land portion 6. In other words, in the tire 1B, a plurality of sipes 7 in the block land portion 6 are connected by the zigzag shallow grooves 10 that cross the block land portion 6 in the width direction groove. The depth H of the shallow groove 10 may be determined according to the depth h of the sipe 7, as in the first embodiment. With this configuration, water captured in the voids of the sipes 7 is drained through the shallow grooves 10 toward the tire width direction, thereby improving the on-ice gripping performance in the block land portion 6.

EXAMPLES

Figure 15:
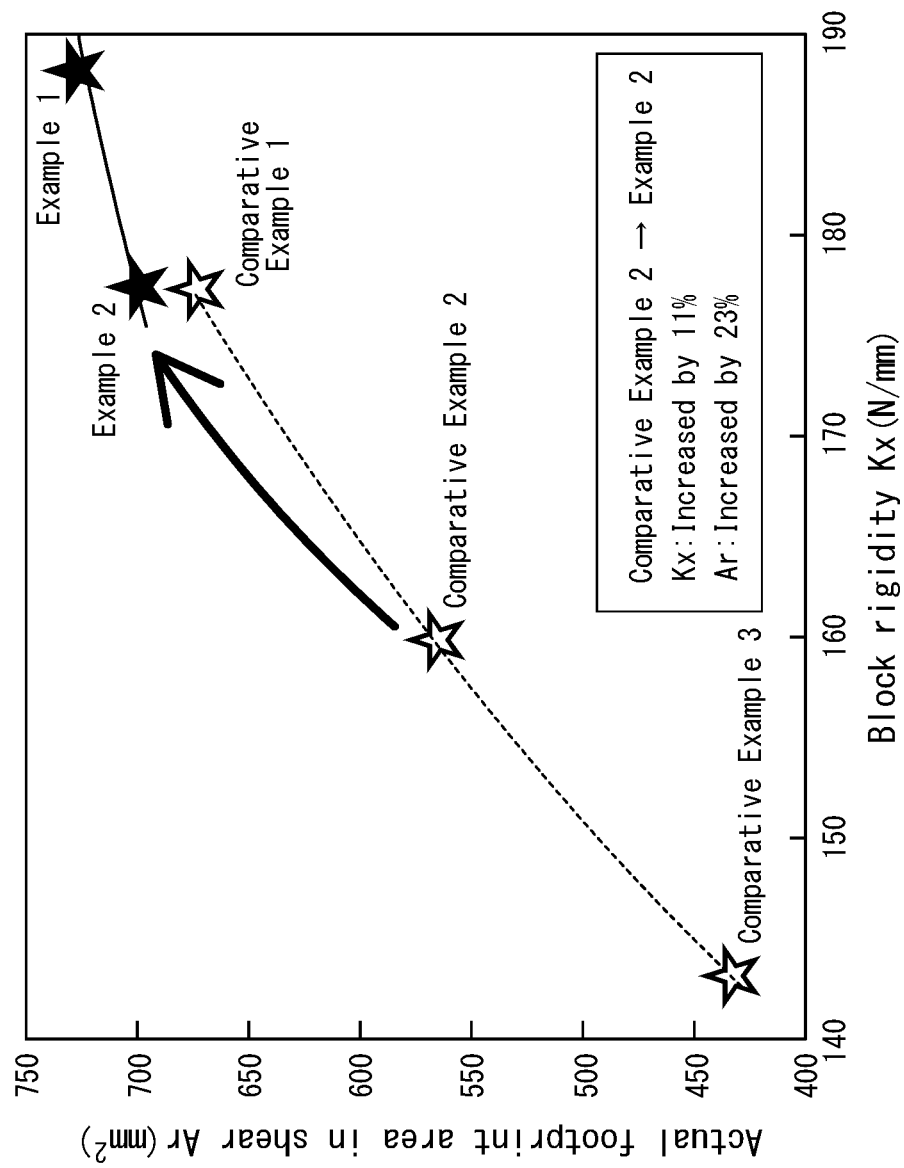
FIG. 15 explains the block rigidity and the footprint area in the Examples and Comparative Examples provided in FIG. 14.

Examples of the tire 1 according to an embodiment of the present disclosure will be described below with reference to FIGS. 14 and 15. FIG. 14 is a table providing Examples and Comparative Examples. FIG. 15 explains the block rigidity and footprint area in the Examples and Comparative Examples provided in FIG. 14.

Finite Element Method (FEM) simulations were performed on the tires of Examples 1 to 2 and Comparative Examples 1 to 3 provided in FIG. 14 under the condition of applying a vertical load, which is obtained by multiplying the outer contour area of the block land portion by a standard ground pressure for passenger vehicle tires of 230 kPa, and thereby evaluating the block rigidity and the footprint area. In Examples 1 to 2 and Comparative Examples 1 to 3, the evaluation was performed as if the sipes provided in the sipe shapes in FIG. 14 were arranged in a diamond-shaped block land portion with a length in the tire circumferential direction of 45.6 mm and a length in the tire width direction of 27 mm, respectively.

As a result, as illustrated in FIG. 15, both of the block rigidity Kx (N/mm) and the actual footprint area in shear Ar ($mm^2$) were improved in Examples compared to Comparative Examples with the same sipe density. For example, Comparative Example 2 had an 11% increase in Kx and a 23% increase in Kx compared to Example 2. Here, the block rigidity Kx (N/mm) is the shear input value in the tire circumferential direction when the transverse displacement in the same direction is 1 mm, and the actual footprint area in shear Ar ($mm^2$) is the remaining footprint area with partial lifting when the shear input in the tire circumferential direction is 0.3 times the above vertical load. Thus, in the tire 1 according to one embodiment of the present disclosure, the on-ice gripping performance can be improved by balancing sipe density and land rigidity (in other words, by improving land rigidity while maintaining sipe density, or by increasing sipe density while maintaining land stiffness).

From the above, it has been revealed that the tire 1 according to an embodiment of the present disclosure improves the on-ice gripping performance of the tire 1.

As described above, the tire 1 of each embodiment of this disclosure is a tire having a land portion 4 (block land portion 6) on a tread surface 2, wherein the land portion 4 (block land portion 6) comprises a sipe unit 8 consisting of a pair of sipes 7, each of the pair of sipes 7 extends such that both ends in the extending direction of the sipes 7 terminate within the land portion 4 (block land portion 6), and the pair of sipes 7 are opposed to each other in the tire circumferential direction only in part in the tire width direction. According to such a configuration, the reduction in rigidity of the land portion 4 (block land portion 6) of the tire 1 due to the arrangement of the sipes 7 on the land portion 4 (block land portion 6) can be controlled, and thus the reduction in the footprint area of the tire 1 can be controlled. In addition, the sipe density in the land portion 4 (block land portion 6) can be maintained while increasing the range in which the sipes 7 can exhibit edge effects and water removal effects. This improves the on-ice gripping performance of the tire 1.

In the tire 1 of each embodiment of this disclosure, it is preferable that each of the pair of sipes 7 extends in a straight line such that the angle φ with respect to the tire width direction satisfies 0°<φ<45°. According to such a configuration, the sipes 7 can contribute not only to the improvement of braking and driving force in the tire circumferential direction, but also to the improvement of lateral grip performance (turning force) in the tire width direction.

In the tire 1 of each embodiment of this disclosure, it is preferable that a plurality of the sipe units 8 are repeatedly arranged in the tire circumferential direction to form a sipe unit row 9 in the land portion 4 (block land portion 6), and the plurality of the sipe units 8 that constitute the sipe unit row 9 are arranged so that both ends in the tire width direction of each sipe unit are aligned on a straight line extending along the tire circumferential direction, respectively. According to such a configuration, in the range of land portion 4 (block land portion 6) where the sipe unit row 9 is arranged, the blank areas where the sipes 7 are not provided can be reduced.

In the tire 1A according to the first embodiment of this disclosure, it is preferable that the land portion 4 (block land portion 6) comprises a plurality of the sipe unit rows 9 arranged side-by-side in the tire width direction, among the plurality of the sipe unit rows 9, the plurality of sipes 7 in the first sipe unit row 9A extend toward one side in the tire width direction while being inclined toward one side in the tire circumferential direction, and the plurality of sipes 7 in the second sipe unit row 9B which is adjacent to the first sipe unit row 9A extend toward the one side in the tire width direction while being inclined toward the one side in the tire circumferential direction. Such a configuration facilitates the arrangement of the blades for forming the sipes 7 in the mold during tire manufacturing, and facilitates the fabrication of molds for the tire 1A.

In the tire 1A according to the first embodiment of this disclosure, it is preferable that each of the plurality of sipes 7 in the second sipe unit row 9B extends over an extension line of any of the sipes 7 in the first sipe unit row 9A. According to this configuration, water captured in the voids of the sipes 7 is drained along the plurality of sipes 7, which are arranged in a straight line, toward the tire width direction, thereby further improving the on-ice gripping performance of the tire 1A.

In the tire 1B according to the second embodiment of this disclosure, it is preferable that the land portion 4 (block land portion 6) comprises a plurality of the sipe unit rows 9 arranged side-by-side in the tire width direction, among the plurality of the sipe unit rows, the plurality of sipes 7 in the first sipe unit row 9A extend toward one side in the tire width direction while being inclined toward one side in the tire circumferential direction, and the plurality of sipes 7 in the second sipe unit row 9B which is adjacent to the first sipe unit row 9A extend toward the one side in the tire width direction while being inclined toward the other side in the tire circumferential direction. According to this configuration, the block land portion 6 is prevented from collapsing when external force is input to the tire 1B, because the land portion 4 (block land portion 6) is supported in the range where the adjacent sipe unit rows 9 are arranged. This increases the rigidity of the land portion 4 (block land portion 6), which in turn increases the footprint area of the tire 1B. This further improves the on-ice gripping performance of the tire 1B.

In the tire 1 according to each embodiment of this disclosure, it is preferable that: when the length of the sipe 7 in the tire width direction is d (mm) and the depth of the sipe 7 is h (mm), d×h is 150 (mm$^2$) or less, and when the number of the sipes 7 in the land portion 4 (block land portion 6) is n, the maximum width of the land portion 4 (block land portion 6) in the tire width direction is BW (mm), the equivalent length in the tire circumferential direction of the land portion 4 (block land portion 6) which is obtained by dividing the outer contour area of the land portion 4 (block land portion 6) (mm$^2$) by the maximum width BW is BL (mm), the number of equivalent sipes N is expressed as d×n/BW, the average sipe spacing in the tire circumferential direction is expressed as BL/(N+1), and the sipe density SD in the tire circumferential direction is expressed as the reciprocal of the average sipe spacing as SD=(N+1)/BL=((d×n/BW)+1)/BL, SD is 0.15 (1/mm) or more. According to such a configuration, the sipe density can be increased while controlling the reduction in rigidity of the land portion 4 (block land portion 6) of the tire 1 due to the arrangement of the sipes 7 on the land portion 4 (block land portion 6). This improves the on-ice gripping performance of the tire 1.

Although our tire has been described based on the drawings and embodiments, it should be noted that one skilled in the art can make various variations and modifications based on this disclosure. Therefore, it is noted that these variations and modifications are included in the scope of this disclosure. For example, the configuration or functions, etc. included in each embodiment can be rearranged so as not to be logically inconsistent. The configuration or functions, etc. included in each embodiment can be used in combination with other embodiments, and multiple configurations or functions, etc. can be combined into one, divided, or partially omitted.

REFERENCE SIGNS LIST 1, 1A, 1B Tire
2 Tread surface
3, 3A, 3B, 3C, 3D Circumferential main groove
4, 4A, 4B, 4C, 4D, 4E) Land portion
5, 5A, 5B Width direction groove
6, 6A, 6B, 6C Block land portion
7, 7A, 7B, 7C Sipe
7a, 7b Part of sipe
8 Sipe unit
9, 9A, 9B Sipe unit row
10 Shallow groove
a Length of sipe
h Depth of sipe
W Width of sipe
d Length of sipe in the tire width direction
s Offset in the tire width direction
q Offset in the tire circumferential direction
φ Angle between the sipe and the tire width direction
p Pitch of units in the tire circumferential direction
r Distance between units in the tire circumferential direction
v Tire widthwise spacing between adjacent sipe units in the tire width direction
u Offset in the tire circumferential direction between adjacent sipe unit rows in the tire width direction
SD Sipe density
N Number of equivalent sipes
BW Maximum width of block land portion in the tire width direction
BL Equivalent length in the tire circumferential direction of the block land portion
A-A', B-B' Cutting surface
E1, E2 End of sipe unit in the tire width direction
TE Tread edge
CL Tire equatorial plane
Ar Actual footprint area in shear
Kx Block rigidity
H Depth of shallow grooves
U Lifting

The invention claimed is:

1. A tire having a land portion on a tread surface, wherein the land portion comprises a plurality of sipe unit rows arranged side-by-side in a tire width direction, each of the plurality of sipe unit rows comprises a plurality of sipe units repeatedly arranged in a tire circumferential direction at the same position in the tire width direction, each of the plurality of sipe units consists of a pair of sipes, each of the pair of sipes extends in a straight line and both ends in an extending direction of each of the pair of sipes terminate within the land portion, the pair of sipes comprises a first sipe and a second sipe, the first sipe is opposed to the second sipe in the tire circumferential direction only in part in the tire width direction, the second sipe is opposed to the first sipe in the tire circumferential direction only in part in the tire width direction, a tire widthwise spacing between two adjacent sipe unit rows of the plurality of sipe unit rows is 0 or more in the tire width direction, and the tire widthwise spacing is a distance in the tire width direction between a first area enclosed by two ends in the tire width direction of one of the two adjacent sipe unit rows and a second area enclosed by two ends in the tire width direction of the other of the two adjacent sipe unit row.

2. The tire according to claim 1, wherein when a length of each sipe included in the plurality of sipe units in the tire width direction is d (mm) and a depth of the sipe is h (mm), d×h is 150 (mm$^2$) or less, and when a number of sipes included in the plurality of sipe units in the land portion is n, a maximum width of the land portion in the tire width direction is BW (mm), an equivalent length in the tire circumferential direction of the land portion obtained by dividing an outer contour area of the land portion (mm$^2$) by the maximum width BW is BL (mm), a number of equivalent sipes N is expressed as d×n/BW, an average sipe spacing in the tire circumferential direction is expressed as BL/(N+1), and a sipe density SD in the tire circumferential direction is expressed as a reciprocal of the average sipe spacing as SD=(N+1)/BL=((d×n/BW)+1)/BL, SD is 0.15 (1/mm) or more.

3. The tire according to claim 1, wherein the tire widthwise spacing between two adjacent sipe unit rows of the plurality of sipe unit rows is 0 in the tire width direction.

4. The tire according to claim 1, wherein the each of the pair of sipes extends in the straight line such that an angle φ with respect to the tire width direction satisfies 0°<φ<45°.

5. The tire according to claim 4, wherein when a length of each sipe included in the plurality of sipe units in the tire width direction is d (mm) and a depth of the sipe is h (mm), d×h is 150 (mm$^2$) or less, and when a number of sipes included in the plurality of sipe units in the land portion is n, a maximum width of the land portion in the tire width direction is BW (mm), an equivalent length in the tire circumferential direction of the land portion obtained by dividing an outer contour area of the land portion (mm$^2$) by the maximum width BW is BL (mm), a number of equivalent sipes N is expressed as d×n/BW, an average sipe spacing in the tire circumferential direction is expressed as BL/(N+1), and a sipe density SD in the tire circumferential direction is expressed as a reciprocal of the average sipe spacing as SD=(N+1)/BL=((d×n/BW)+1)/BL, SD is 0.15 (1/mm) or more.

6. The tire according to claim 4, wherein the plurality of sipe units that constitute the sipe unit row are arranged so that both ends in the tire width direction of each sipe unit are aligned on a straight line extending along the tire circumferential direction, respectively.

7. The tire according to claim 6, wherein when a length of each sipe included in the plurality of sipe units in the tire width direction is d (mm) and a depth of the sipe is h (mm), d×h is 150 (mm$^2$) or less, and when a number of sipes included in the plurality of sipe units in the land portion is n, a maximum width of the land portion in the tire width direction is BW (mm), an equivalent length in the tire circumferential direction of the land portion obtained by dividing an outer contour area of the land portion (mm$^2$) by the maximum width BW is BL (mm), a number of equivalent sipes N is expressed as d×n/BW, an average sipe spacing in the tire circumferential direction is expressed as BL/(N+1), and a sipe density SD in the tire circumferential direction is expressed as a reciprocal of the average sipe spacing as SD=(N+1)/BL=((d×n/BW)+1)/BL, SD is 0.15 (1/mm) or more.

8. The tire according to claim 6, wherein among the plurality of sipe unit rows, a plurality of sipes in a first sipe unit row extend toward one side in the tire width direction while being inclined toward one side in the tire circumferential direction, and a plurality of sipes in a second sipe unit row which is adjacent to the first sipe unit row extend toward the one side in the tire width direction while being inclined toward the other side in the tire circumferential direction.

9. The tire according to claim 8, wherein when a length of each sipe included in the plurality of sipe units in the tire width direction is d (mm) and a depth of the sipe is h (mm), d×h is 150 (mm$^2$) or less, and when a number of sipes included in the plurality of sipe units in the land portion is n, a maximum width of the land portion in the tire width direction is BW (mm), an equivalent length in the tire circumferential direction of the land portion obtained by dividing an outer contour area of the land portion (mm$^2$) by the maximum width BW is BL (mm), a number of equivalent sipes N is expressed as d×n/BW, an average sipe spacing in the tire circumferential direction is expressed as BL/(N+1), and a sipe density SD in the tire circumferential direction is expressed as a reciprocal of the average sipe spacing as SD=(N+1)/BL=((d×n/BW)+1)/BL, SD is 0.15 (1/mm) or more.

10. The tire according to claim 6, wherein among the plurality of sipe unit rows, a plurality of sipes in a first sipe unit row extend toward one side in the tire width direction while being inclined toward one side in the tire circumferential direction, and a plurality of sipes in a second sipe unit row which is adjacent to the first sipe unit row extend toward the one side in the tire width direction while being inclined toward the one side in the tire circumferential direction.

11. The tire according to claim 10, wherein when a length of each sipe included in the plurality of sipe units in the tire width direction is d (mm) and a depth of the sipe is h (mm), d×h is 150 (mm$^2$) or less, and when a number of sipes included in the plurality of sipe units in the land portion is n, a maximum width of the land portion in the tire width direction is BW (mm), an equivalent length in the tire circumferential direction of the land portion obtained by dividing an outer contour area of the land portion (mm$^2$) by the maximum width BW is BL (mm), a number of equivalent sipes N is expressed as d×n/BW, an average sipe spacing in the tire circumferential direction is expressed as BL/(N+1), and a sipe density SD in the tire circumferential direction is expressed as a reciprocal of the average sipe spacing as SD=(N+1)/BL=((d×n/BW)+1)/BL, SD is 0.15 (1/mm) or more.

12. The tire according to claim 10, wherein each of the plurality of sipes in the second sipe unit row extends over an extension line of any of the sipes in the first sipe unit row.

13. The tire according to claim 12, wherein
when a length of each sipe included in the plurality of sipe units in the tire width direction is d (mm) and a depth of the sipe is h (mm), d×h is 150 (mm²) or less, and
when a number of sipes included in the plurality of sipe units in the land portion is n, a maximum width of the land portion in the tire width direction is BW (mm), an equivalent length in the tire circumferential direction of the land portion obtained by dividing an outer contour area of the land portion (mm²) by the maximum width BW is BL (mm), a number of equivalent sipes N is expressed as d×n/BW, an average sipe spacing in the tire circumferential direction is expressed as BL/(N+1), and a sipe density SD in the tire circumferential direction is expressed as a reciprocal of the average sipe spacing as SD=(N+1)/BL=((d×n/BW)+1)/BL, SD is 0.15 (1/mm) or more.

14. The tire according to claim 1, wherein the plurality of sipe units that constitute the sipe unit row are arranged so that both ends in the tire width direction of each sipe unit are aligned on a straight line extending along the tire circumferential direction, respectively.

15. The tire according to claim 14, wherein
when a length of each sipe included in the plurality of sipe units in the tire width direction is d (mm) and a depth of the sipe is h (mm), d×h is 150 (mm²) or less, and
when a number of sipes included in the plurality of sipe units in the land portion is n, a maximum width of the land portion in the tire width direction is BW (mm), an equivalent length in the tire circumferential direction of the land portion obtained by dividing an outer contour area of the land portion (mm²) by the maximum width BW is BL (mm), a number of equivalent sipes N is expressed as d×n/BW, an average sipe spacing in the tire circumferential direction is expressed as BL/(N+1), and a sipe density SD in the tire circumferential direction is expressed as a reciprocal of the average sipe spacing as SD=(N+1)/BL=((d×n/BW)+1)/BL, SD is 0.15 (1/mm) or more.

16. The tire according to claim 14, wherein
among the plurality of sipe unit rows, a plurality of sipes in a first sipe unit row extend toward one side in the tire width direction while being inclined toward one side in the tire circumferential direction, and
a plurality of sipes in a second sipe unit row which is adjacent to the first sipe unit row extend toward the one side in the tire width direction while being inclined toward the other side in the tire circumferential direction.

17. The tire according to claim 16, wherein
when a length of each sipe included in the plurality of sipe units in the tire width direction is d (mm) and a depth of the sipe is h (mm), d×h is 150 (mm²) or less, and
when a number of sipes included in the plurality of sipe units in the land portion is n, a maximum width of the land portion in the tire width direction is BW (mm), an equivalent length in the tire circumferential direction of the land portion obtained by dividing an outer contour area of the land portion (mm²) by the maximum width BW is BL (mm), a number of equivalent sipes N is expressed as d×n/BW, an average sipe spacing in the tire circumferential direction is expressed as BL/(N+1), and a sipe density SD in the tire circumferential direction is expressed as a reciprocal of the average sipe spacing as SD=(N+1)/BL=((d×n/BW)+1)/BL, SD is 0.15 (1/mm) or more.

18. The tire according to claim 14, wherein
among the plurality of sipe unit rows, a plurality of sipes in a first sipe unit row extend toward one side in the tire width direction while being inclined toward one side in the tire circumferential direction, and
a plurality of sipes in a second sipe unit row which is adjacent to the first sipe unit row extend toward the one side in the tire width direction while being inclined toward the one side in the tire circumferential direction.

19. The tire according to claim 18, wherein
when a length of each sipe included in the plurality of sipe units in the tire width direction is d (mm) and a depth of the sipe is h (mm), d×h is 150 (mm²) or less, and
when a number of sipes included in the plurality of sipe units in the land portion is n, a maximum width of the land portion in the tire width direction is BW (mm), an equivalent length in the tire circumferential direction of the land portion obtained by dividing an outer contour area of the land portion (mm²) by the maximum width BW is BL (mm), a number of equivalent sipes N is expressed as d×n/BW, an average sipe spacing in the tire circumferential direction is expressed as BL/(N+1), and a sipe density SD in the tire circumferential direction is expressed as a reciprocal of the average sipe spacing as SD=(N+1)/BL=((d×n/BW)+1)/BL, SD is 0.15 (1/mm) or more.

20. The tire according to claim 18, wherein each of the plurality of sipes in the second sipe unit row extends over an extension line of any of the sipes in the first sipe unit row.

21. The tire according to claim 20, wherein
when a length of each sipe included in the plurality of sipe units in the tire width direction is d (mm) and a depth of the sipe is h (mm), d×h is 150 (mm²) or less, and
when a number of sipes included in the plurality of sipe units in the land portion is n, a maximum width of the land portion in the tire width direction is BW (mm), an equivalent length in the tire circumferential direction of the land portion obtained by dividing an outer contour area of the land portion (mm²) by the maximum width BW is BL (mm), a number of equivalent sipes N is expressed as d×n/BW, an average sipe spacing in the tire circumferential direction is expressed as BL/(N+1), and a sipe density SD in the tire circumferential direction is expressed as a reciprocal of the average sipe spacing as SD=(N+1)/BL=((d×n/BW)+1)/BL, SD is 0.15 (1/mm) or more.

* * * * *